United States Patent
Anton et al.

(10) Patent No.: US 9,400,070 B2
(45) Date of Patent: Jul. 26, 2016

(54) CONDUIT FITTING WITH SENSOR ON A THREADED NUT

(71) Applicant: Swagelok Company, Solon, OH (US)

(72) Inventors: Arthur Frank Anton, Shaker Heights, OH (US); Michael Ray Butkovic, Aurora, OH (US); Johan Jan Goemans, Concord, OH (US); Dale C. Arstein, Highland Heights, OH (US); Franziska H. Dacek, Brecksville, OH (US); Gerhard H. Schiroky, Aurora, OH (US); Larry Dean Vandendriessche, Bentleyville, OH (US); William H. Glime, III, Chagrin Falls, OH (US); Peter C. Williams, Cleveland Heights, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 14/658,592

(22) Filed: Mar. 16, 2015

(65) Prior Publication Data

US 2015/0252922 A1    Sep. 10, 2015

Related U.S. Application Data

(63) Continuation of application No. 13/863,577, filed on Apr. 16, 2013, now Pat. No. 9,010,810, which is a
(Continued)

(51) Int. Cl.
*F16L 33/16* (2006.01)
*F16L 15/08* (2006.01)
(Continued)

(52) U.S. Cl.
CPC .............. *F16L 15/08* (2013.01); *F16J 15/064* (2013.01); *F16L 15/04* (2013.01); *F16L 19/0283* (2013.01); *F16L 19/05* (2013.01); *F16L 19/12* (2013.01)

(58) Field of Classification Search
USPC ............................ 285/93, 387.7, 342; 73/761
See application file for complete search history.

(56) References Cited

U.S. PATENT DOCUMENTS 3,873,102 A    3/1975  Lotze et al.
4,915,427 A *  4/1990  Zahuranec ............ F16L 19/103
                                                    285/342
(Continued)

FOREIGN PATENT DOCUMENTS

GB    2329023    3/1999
GB    2353342    2/2001
(Continued)

OTHER PUBLICATIONS

Translated Office action from Japanese Application No. 2014-248586 dated Dec. 2, 2015.
(Continued)

*Primary Examiner* — Aaron Dunwoody
(74) *Attorney, Agent, or Firm* — Calfee, Halter & Griswold LLP

(57) ABSTRACT

Apparatus and method for mechanically attached connections of conduits may include a conduit gripping member, a drive member, and a seal member, the drive member causing axial movement of the conduit gripping member to indent into an outer surface of the conduit when the assembly is pulled-up, the drive member causing the seal member to form a zero clearance seal at a location that is axially spaced from the conduit gripping member. The zero clearance seal may comprise a face seal arrangement including a gasket, and the conduit gripping member may be a ferrule, ring or other device that can grip and optionally seal against the conduit outer surface. The assembly may include a sensing function for detecting or sensing a characteristic or condition of an assembly component or the fluid or both. In one embodiment, a body coupling member has a two piece construction of a main body and a conduit socket insert. A flared fitting embodiment is also provided. Sensing functions are also incorporated into fittings other than just zero clearance fittings.

13 Claims, 14 Drawing Sheets

Related U.S. Application Data continuation of application No. 12/665,875, filed as application No. PCT/US2008/068147 on Jun. 25, 2008, now Pat. No. 8,439,404.

(60) Provisional application No. 60/937,277, filed on Jun. 26, 2007, provisional application No. 61/040,178, filed on Mar. 28, 2008, provisional application No. 61/040,175, filed on Mar. 28, 2008, provisional application No. 61/040,189, filed on Mar. 28, 2008, provisional application No. 61/040,184, filed on Mar. 28, 2008, provisional application No. 61/040,177, filed on Mar. 28, 2008.

(51) Int. Cl.
*F16J 15/06* (2006.01)
*F16L 19/028* (2006.01)
*F16L 19/05* (2006.01)
*F16L 19/12* (2006.01)
*F16L 15/04* (2006.01)

(56) References Cited

U.S. PATENT DOCUMENTS

| | | | |
|---|---|---|---|
| 5,528,935 | A | 6/1996 | Welch et al. |
| 5,714,680 | A | 2/1998 | Taylor et al. |
| 5,831,149 | A | 11/1998 | Webb |
| 6,438,814 | B1 | 8/2002 | Seymour et al. |
| 6,578,422 | B2 | 6/2003 | Lam et al. |
| 7,284,433 | B2 | 10/2007 | Ales et al. |
| 7,581,445 | B2 | 9/2009 | Ales et al. |
| 7,591,181 | B2 | 9/2009 | Ales et al. |
| 2005/0242582 | A1 | 11/2005 | Williams et al. |
| 2006/0225511 | A1* | 10/2006 | Burmann ............ G01L 5/246 73/761 |
| 2010/0201118 | A1 | 8/2010 | Anton |
| 2011/0199220 | A1 | 8/2011 | McAlister |
| 2012/0005878 | A1 | 1/2012 | Rubinski et al. |

FOREIGN PATENT DOCUMENTS

| | | |
|---|---|---|
| JP | 62-002091 | 1/1987 |
| JP | 63-308290 | 12/1988 |
| JP | 06-221885 | 8/1994 |
| JP | 6-87858 | 12/1994 |
| JP | 11-316000 | 11/1999 |
| JP | 2000-161548 | 6/2000 |
| JP | 2001108181 | 4/2001 |
| JP | 2001294143 | 10/2001 |
| JP | 2002236064 | 8/2002 |
| JP | 2002267051 | 9/2002 |
| JP | 2005-003038 | 1/2005 |
| JP | 2005-299701 | 10/2005 |
| WO | 01/73333 | 10/2001 |
| WO | 02/33371 | 4/2002 |
| WO | 2007/002576 | 1/2007 |
| WO | 2009/028283 | 3/2009 |

OTHER PUBLICATIONS

Office action from Japanese Application No. 2010-515064 dated Jan. 29, 2014.
Office action from Japanese Application No. 2013-158562 dated Jun. 4, 2014.
Office action from Japanese Application No. 2010-515064 dated Jan. 30, 2013.
International Search Report and Written Opinion from PCT/US08/068145 dated Oct. 2, 2008.
International Search Report and Written Opinion from PCT/US08/068147 dated Dec. 3, 2008.

* cited by examiner

CONDUIT FITTING WITH SENSOR ON A THREADED NUT

RELATED APPLICATIONS

The present application is a continuation application of U.S. Ser. No. 13/863,577, filed Apr. 16, 2013 titled "Conduit Connection with Non-Wetted Strain Sensor", which is a continuation application of U.S. Ser. No. 12/665,875, filed Dec. 21, 2009, now U.S. Pat. No. 8,439,404, titled "Conduit Connection with Sensing Function" which is the U.S. national phase entry of PCT/US2008/068147, with an international filing date of Jun. 25, 2008, which claims the benefit of the following U.S. Provisional patent applications: U.S. provisional application Ser. No. 61/040,178, filed on Mar. 28, 2008, entitled Apparatus and Method of Zero Clearance Connection with Sensing Function, U.S. provisional application Ser. No. 61/040,175, filed on Mar. 28, 2008, entitled Apparatus and Method of Fitting Component with Sensing Function, U.S. provisional application Ser. No. 61/040,177, filed on Mar. 28, 2008, entitled Apparatus and Method of Fitting with Sensing Function, U.S. provisional application Ser. No. 61/040,184, filed on Mar. 28, 2008, entitled Apparatus and Method of Face Seal Connection with Sensing Function, U.S. provisional application Ser. No. 61/040,189, filed on Mar. 28, 2008, entitled Conduit Connection with Split Body and Optional Sensing Function, and U.S. provisional application Ser. No. 60/937,277, filed on Jun. 26, 2007, entitled Smart Fittings. The entire disclosures of all of the aforesaid applications are fully incorporated herein by reference.

BACKGROUND OF THE DISCLOSURE

The present disclosure relates to mechanically attached connections such as fittings, joints, couplings, unions and so on that are used in fluid systems or fluid circuits to contain fluid flow and fluid pressure. Such mechanically attached connections may be used with but are not limited to conduit fittings for tube, pipe or any other type of conduit, and that connect a conduit end to either another conduit end or to another portion, element or component of a fluid system. For simplicity and clarity, the term 'fitting' as used herein is intended to be all inclusive of other terms, for example coupling, connection, union, joint and so on, that could alternatively be used to refer to a mechanically attached connection. Such mechanically attached connections are characterized by a fluid tight seal and mechanical strength to hold the connection together including sufficient grip of the conduit under vibration, stress and pressure. Fluids may include gas, liquid, slurries and any variation or combination thereof.

Fluid systems and circuits typically use mechanically attached connections to interconnect conduit ends to each other and to flow devices which may control flow, contain flow, regulate flow, measure one or more characteristics of the fluid or fluid flow, or otherwise influence the fluid within the fluid system. Fluid systems are found everywhere, from the simplest residential plumbing system, to the most complex fluid systems for the petrochemical, semiconductor, biopharmaceutical, medical, food, commercial, residential, manufacturing, analytical instrumentation and transportation industries to name just a few examples. Complex systems may include thousands of fittings, either fittings being installed as a new installation or as part of repair, maintenance or retrofit operations, or fittings that were previously installed.

The term 'mechanically attached connection' as used herein means any connection for or in a fluid system that involves at least one connection that is held in place by mechanically applied force, stress, pressure, torque, or the like, such as, for example, a threaded connection, a clamped connection, a bolted or screwed connection and so on. This is distinguished from a metallurgical or chemical connection most commonly practiced as welding, brazing, soldering, adhesive and so forth. A mechanically attached connection may include a combination of mechanical and metallurgical connections, and often does, and such connections are also within the term 'mechanically attached connections' as they include at least one such connection.

SUMMARY OF THE DISCLOSURE

In accordance with one of the inventions presented in this disclosure, a zero clearance fitting or assembly for a conduit mechanically attached connection is provided. In one embodiment, a fitting for conduit connection may include a conduit gripping member that optionally indents into an outer surface of the conduit, and may optionally seal against that outer surface. In another embodiment, the fitting further includes a seal element that forms a zero clearance seal that is axially spaced from the conduit gripping indentation. In still a further embodiment, a seal element is disposed between a facing surface of a face seal member and a face seal surface on another facing surface. In a more specific exemplary embodiment, the seal element comprises a gasket axially compressed between two facing surfaces. In another embodiment, the conduit gripping member and seal arrangement, and in some cases additional parts, may optionally be held together as a separate subassembly or preassembly.

In accordance with another invention presented in this disclosure, a mechanically attached connection for conduits is contemplated that includes a zero clearance seal as part of a zero clearance fitting or assembly for conduit connection, along with a sensing function that is integrated or incorporated into one or more parts of the fitting. In an exemplary embodiment, a sensing function may be included or associated with a seal element that is also used to provide a zero clearance seal in the assembly. In a more specific exemplary embodiment, the sensing function may be realized in the form of a sensor or device that is embedded, attached, integrated or otherwise incorporated with or associated with the seal element.

In accordance with another invention presented in this disclosure, a fitting is provided that utilizes a split body concept in which the body coupling member comprises a main body and a conduit socket insert. The main body and the insert may optionally include a sensing function or functions. Another invention presented herein provides a smart fitting for a flared conduit fitting.

In accordance with an inventive aspect of the disclosure, a fitting, or one or more components of a fitting, is provided with electrical, electro-magnetic or electronic capability such as for example in the form of a sensor or other device that facilitates utility of the fitting, including one or more of, but not limited to, component identification, component compatibility, installation and assembly, and any other type of information that may be useful to a manufacturer, installer or end user. The present disclosure further contemplates associated methods of including such capability in a fitting or fitting components as well as methods associated with the use of such fittings.

In accordance with another of the inventions presented in this disclosure, a mechanically attached connection or fitting for conduits and other fluid components is contemplated that includes one or more sensing functions that are integrated with or incorporated into or otherwise associated with one or more components of the fitting, or may be introduced into an existing fitting assembly or component thereof. In an exemplary embodiment, a sensing function may be included or associated with a coupling member in the assembly. In a more specific exemplary embodiment, one or more sensing functions may be realized in the form of one or more sensors or devices that is embedded, attached, integrated or otherwise incorporated with or associated with a coupling nut or coupling body or both.

In still another embodiment, the sensing function may be introduced into a fitting such as by further including with the assembly a component that includes a sensing function, whether the component comprises a sealing or non-sealing function as well as the sensing function. In another embodiment, for example, the sensing function may be introduced into a fitting with a sensor carrier or substrate such as a gasket, ring or washer-like device.

BRIEF DESCRIPTION OF THE DRAWINGS

FIG. 4 is an enlarged view of the circle B region in FIG. 1;

DESCRIPTION OF THE EXEMPLARY EMBODIMENTS

Figure 1:
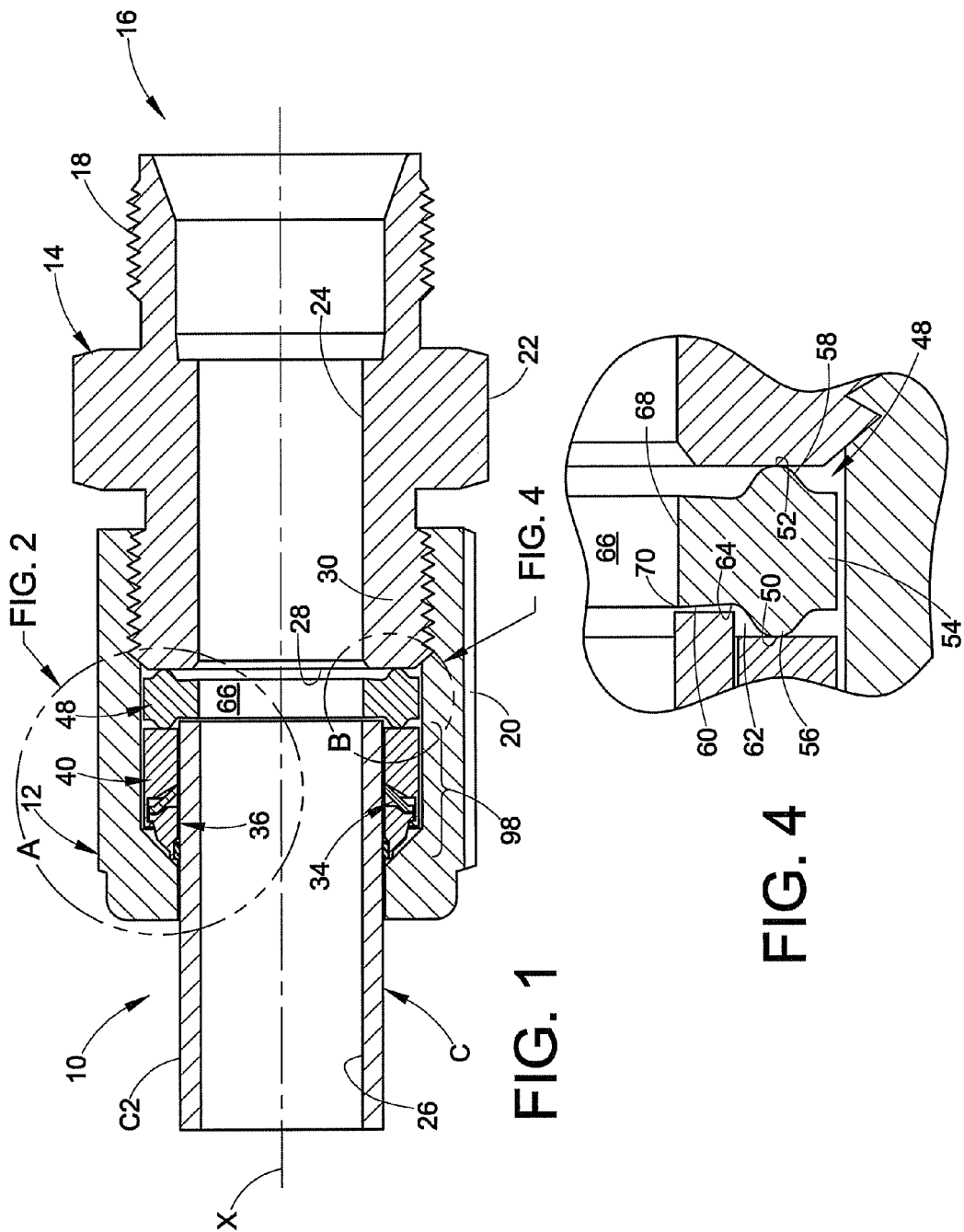
FIG. 1 is an embodiment of a fitting incorporating one or more inventions disclosed herein, illustrated in longitudinal cross-section, with the parts assembled in a finger-tight condition.

Although the various embodiments are described herein with specific reference to a tube fitting, and more specifically to a tube fitting for stainless steel tubing, those skilled in the art will readily appreciate that the inventions herein may be used with any metal or non-metal conduit and any metal or non-metal fitting components, including but not limited to plastics, polymers and so on. The inventions may also be used with thinner walled conduits or thicker walled conduits. As used herein, the term 'zero clearance' refers to an arrangement by which a fitting that has been previously attached to a conduit end and connected to another fluid member, such fitting may be loosened to allow separation of the conduit end from the other fluid member, without requiring axial displacement of the conduit end. In a more general concept, a zero clearance fitting facilitates disassembly of the fitting so that the fitting may be separated without requiring axial displacement of the conduit end that is attached to the fitting. For example, a zero clearance fitting that includes a zero clearance seal may allow separating of a first coupling component—for example a nut—from a second coupling component—for example a body—to permit the conduit end to be disconnected from the other fluid member, with a simple radial movement or displacement. Moreover, while the exemplary embodiments illustrate a connection between a conduit end and a particular type of fluid member (a coupling body), such illustration if for explanation purposes only and should not be construed in a limiting sense. The inventions herein may be used to connect a conduit end to any fluid member, such as but not limited to, another conduit end, a coupling component or member, a flow control member such as a valve, regulator, filter and so on. The zero clearance aspect of the present inventions facilitates installing and removing a fitting in a fluid system by eliminating any need for axial displacement of the conduit end relative to the other fluid member it was coupled to, all while maintaining conduit grip and seal when the fitting is in an installed and completed pulled-up condition. By finger-tight condition is meant that the various parts have been assembled onto a conduit end but in a fairly loose or sometimes snug condition achieved by the rather low manual assembly force or torque. By 'completed pulled-up condition' is meant that the fitting has been tightened onto a conduit end to complete a connection between the conduit end and another fluid member, with an established conduit grip and seal. Between finger-tight and completed pulled-up condition may be intermediate pull-up and assembly steps as the fitting is being tightened. Also used herein is the term "make-up" or a fitting that is "made-up" which is similar to "pull-up" in that the terms refer to the process of assembling and tightening the fitting onto a conduit end. Reference herein to a 'subassembly' or 'preassembly' of fitting parts, and derivatives of those terms, refers to two or more parts that may separately be assembled or joined and held together by any convenient arrangement or method as an integral or single unit to simplify final assembly of the fitting by reducing the opportunity for incorrect installation of the various parts. The terms fluid system and fluid circuit are used somewhat interchangeably herein, with a fluid system generally referring to a more complex arrangement for fluid containment, whereas a fluid circuit may be as simple as a conduit connected to another fluid device by a mechanically attached connection. The present inventions are applicable to all different kinds of fluid systems and circuits regardless of the complexity.

The present disclosure also relates to including a sensing function with a mechanically attached connection including but not limited to a zero clearance fitting, assembly or mechanically attached connection for conduits. As used herein, sensing function, and any embodiment of a sensing function in a 'sensor', is intended to be construed in its broadest context as the capability, for example, but not limited to, sense, detect, measure, indicate, report, feedback or collect, or any combination thereof, information, condition, status, state or data relating to the fitting or assembly, one or more of the fitting or assembly components, members or parts, and/or the fluid contained by the fitting or assembly. By sensing fluid contained by the fitting is meant sensing the fluid within the boundaries of the fitting, as distinguished from a sensor or sensing function downstream or upstream of the fitting assembly. The sensing function may be realized by a sensor that is either wetted or non-wetted or both. A wetted sensor is one having at least a portion thereof exposed to the fluid contained by the fitting or mechanically attached connection, while a non-wetted sensor is one that is isolated from contact with the fluid.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIG. 1, a first embodiment of one or more of the inventions is presented. An assembly 10 for mechanically attaching or connecting a conduit end C to another fluid member is illustrated. The assembly 10 is also referred to herein as a mechanically attached connection or fitting, but the term fitting is intended to be broadly construed as any arrangement by which a conduit end may be mechanically attached or connected to another fluid component. For reference purposes only, the conduit C has a central longitudinal axis X. Reference herein to 'axial' movement or displacement and 'radial' movement or displacement is made with respect to the axis X.

The assembly 10 may include a first coupling member or component 12 and a second coupling member or component 14. The coupling components may be any suitable arrangement by which the assembly 10 is installed with conduit grip and seal on the conduit end C. For the FIG. 1 embodiment, the first coupling component 12 may be realized in the form of a female threaded nut, and the second coupling component may be realized in the form of a male threaded body. Typically, a coupling member in the form of a 'body' receives the conduit end, typically but not necessarily in a conduit socket. However, in the case of zero clearance fittings as taught herein, the body 14 provides a zero clearance seal surface as will be described below and does not receive the conduit C end. However, the body 14 may have end configurations such as at 16 that do accept a conduit end. Therefore, for purposes of this disclosure we consider a body to be a coupling member that is joinable to another coupling member such as a nut. A coupling member in the form of a 'nut' is joined to the body to tighten or pull-up the fitting to a made condition with proper conduit grip and seal, with the nut typically including a drive surface that engages the conduit gripping member during pull-up or may alternatively engage a drive member that engages the gripping member. These components (such as the nut and body for example) are 'coupling' in the sense that they can be joined together by relative axial movement with respect to each other, and tightened so as to install the assembly 10 onto the conduit end C so that the assembly 10 grips the conduit to prevent the conduit from loosening under any one or more environmental stresses such as temperature, pressure, strain and vibration to name a few examples. The assembly 10 also provides a seal against loss of fluid. The fluid that is carried by the conduit C may be gas, liquid, a combination thereof or any other fluid medium. The assembly 10 may find typical application in making connections within an overall fluid system. It should also be noted that one or both of the coupling members may in practice be part of or integral with a fluid component, and not necessarily a discrete component as illustrated herein. For example, the body 14 may be integrated or associated with another device or structure, such as a fluid control device such as a valve or valve body, flow meter, tank, a manifold or any other fluid component to which a conduit is to be attached.

The coupling body 14 may itself be considered a fluid member that is connected to the conduit end C, or may include an end configuration 16 that may be further connected to another part, such as a fluid component, another conduit end and so on. As shown, the end connection 16 of FIG. 1 may include a male threaded end 18 of a conventional tube fitting body, but any end connection configuration may be used as needed to connect the conduit end C into the fluid system or to another fluid member.

Figure 2:
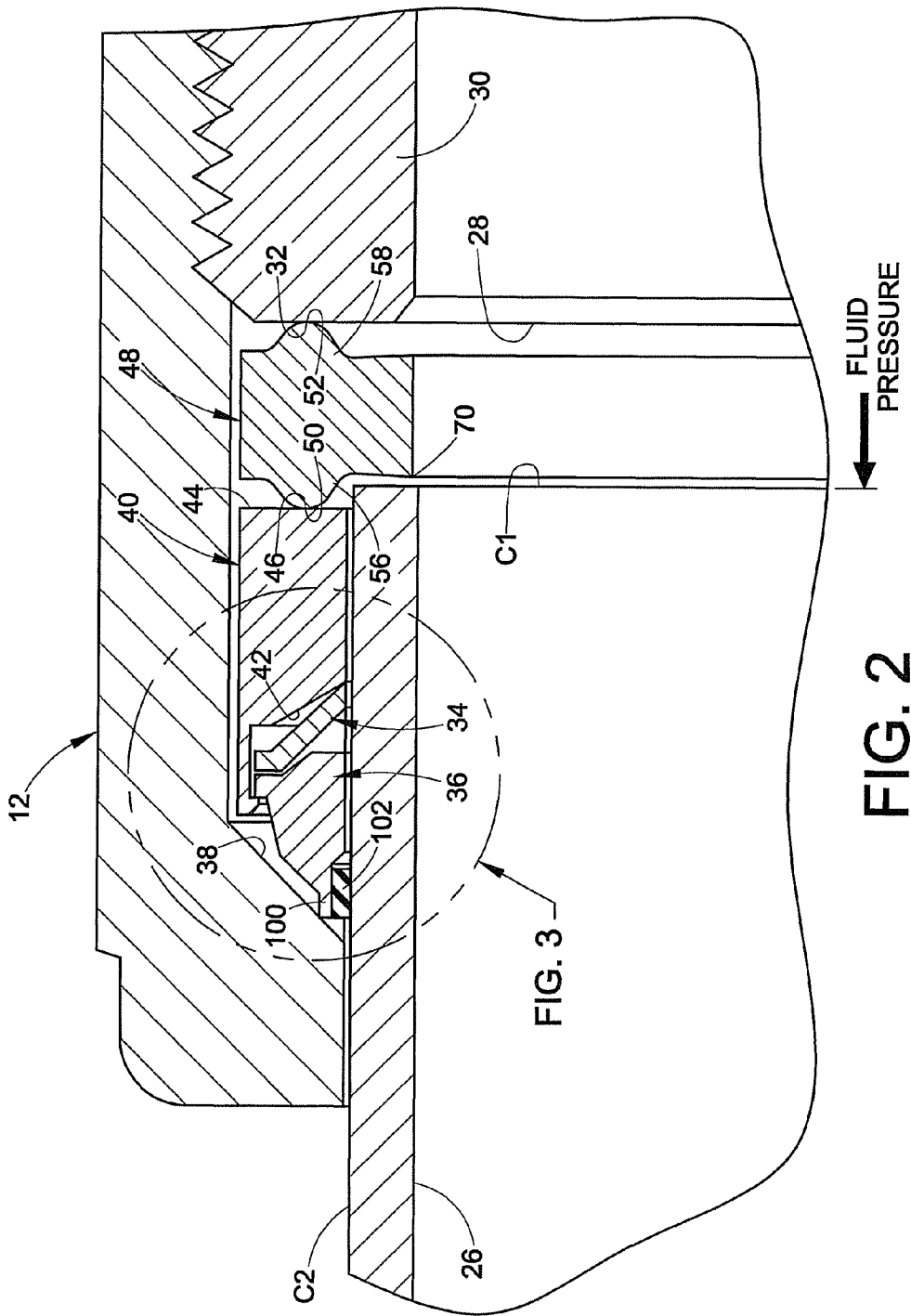
FIG. 2 is an enlarged view of the circle A region in FIG. 1.

Although this embodiment provides for a threaded connection between the first and second coupling components 12, 14, threaded connections are only one of the many available choices. Alternatives include but are not limited to clamped or bolted connections. The type of connection used will be determined by the nature of the force needed to secure the assembly 10 to the conduit end in a fluid tight manner. Generally speaking, a fitting such as illustrated in FIG. 1 may be used for a flareless end connection, meaning that the conduit cylindrical shape is not flared as a processing step prior to connection to another fluid member (although the conduit may plastically deform during the installation process). The conduit end does not require any particular preparation other than perhaps the usual face and debur process for the end surface C1 (FIG. 2). In still a further alternative embodiment, the male and female threading may be reversed for the first and second coupling components.

The first coupling component 12 and second coupling component 14 may include wrench flats 20, 22 respectively to assist in joining and tightening the assembly 10 together during pull-up of the fitting. Relative rotation between the coupling components 12, 14 may be used to tighten and loosen the fitting as appropriate.

The body 14 may include a central bore 24 having a diameter that is about the same or the same as the diameter of inside cylindrical wall 26 of the conduit C. For most connections, although not necessarily required in all cases, the bore 24 and conduit C are aligned and assembled in a coaxial manner along the axis X.

The second coupling component 14 further includes a first end face or facing surface 28 at an inner end portion 30 thereof. This end face or facing surface 28 presents a seal surface 32 for purposes which will be more fully explained herein below. The seal surface 32 in this embodiment comprises a generally planar face seal surface, however, other seal surface configurations may be alternatively used based on the type of seal that will interface with the seal surface 32. For example, in the embodiment of FIG. 1, the seal surfaces may include recesses (not shown) that help to align the beads of the seal element 48 during assembly and tightening. From FIG. 1 it will be appreciated that when the first and second coupling components 12, 14 are separated, for example after the fitting 10 has been installed on a conduit end, a simple radial movement or displacement may be used to undo the assembly 10, or in other words to separate the conduit end C from the body 14. This configuration thus achieves a zero clearance connection because the fitting components can be separated without need for axial movement of the conduit C relative to the body 14. In various embodiments, though not necessarily required in all cases, the zero clearance seal is axially separated or spaced from the conduit gripping member, particularly the region where the conduit gripping member indents or otherwise grips the conduit outer surface. Accordingly, the seal that is made at the facing surface 28 is referred to herein as a zero clearance seal, and the assembly or fitting 10 is referred to herein as a zero clearance assembly or fitting. More generally, a zero clearance seal arrangement comprises those parts that together form a zero clearance seal when the fitting is pulled up. In this first embodiment then, a zero clearance seal arrangement may include a face seal insert (40, see below), a seal element such as a gasket for example (48, see below) and one of the coupling components, in this example the body 14. But many alternative embodiments may use different parts and different configurations and shapes to effect a zero clearance seal. In an alternative embodiment, the beads may be provided on one or both of the planar facing surfaces, rather than on the gasket, and the gasket may have flat planar surfaces. Additionally, a zero clearance fitting is provided wherein after disassembly the gripping member remains on the conduit, thus facilitating re-makes of the fitting 10 (a re-make refers to subsequent make-up or pull-up of the fitting after a prior installation of the fitting on a conduit end).

With reference to FIGS. 1 and 2, the assembly 10 may further include one or more parts that may be used to effect conduit grip and seal. A conduit gripping member 34 may be provided to grip the conduit C against an outer surface C2 thereof. For higher pressure applications it may be desirable for the gripping member 34 to indent, cut or bite into the conduit outer surface C so as to provide a strong gripping pressure and resistance to the conduit C backing away under pressure and potentially compromising fluid tight seals within the fitting 10. However, in lower pressure applications the gripping member 34 may be designed to adequately grip the conduit without actually indenting or cutting the conduit surface C2. In addition to providing an appropriate gripping force on the conduit C, the gripping member 34 may also provide a primary or secondary fluid tight seal against the conduit external surface C2 to protect against loss of fluid from the assembly 10. Therefore, as understood herein, a conduit gripping member is any part or combination of parts that, upon complete pull-up of the fitting, grips the conduit against pressure, vibration and other environmental effects, and optionally also may provide a fluid tight seal.

A drive member 36 may be used to assist in applying the needed force to the conduit gripping member 34 during pull-up of the fitting so as to cause the gripping member 34 to deflect or otherwise deform (from its unstressed condition such as in FIG. 1) to grip and optionally seal against the conduit C. In alternative applications, the drive member 36 may not be needed, and an interior surface such as a drive surface 38 of the first fitting component 12 may be used (with additional suitable modifications to the gripping member 34 and seal member 40) to drive the gripping member 34 into gripping engagement with the conduit C.

A face seal member or insert 40 may be used to assist or in cooperation with the driving member 36 in causing the gripping member 34 to grip and optionally seal against the conduit C. The face seal member 40 may optionally provide another primary or secondary seal area where the gripping member 34 engages with an interior surface 42 of the face seal member 40. The face seal member 40 is referred to herein as a seal member because a significant though optional aspect of that component is to provide an end face 44 that presents a second seal surface 46 that faces the first end face 28 and first seal surface 32 of the second coupling component 14. In this exemplary embodiment the seal surfaces 32, 46 are generally flat planar facing surfaces and function as face seal surfaces, in that the fluid tight seal areas are presented in the generally planar surfaces 28, 44. Again, the face seal surfaces 32, 46 may be configured as needed to conform to the shape or geometry of an intermediate seal element 48. In many embodiments, the face seal member 40 may be realized in the form of a gland or body having an appropriate geometry and configuration to present a seal surface to one side of the seal element 48.

With reference to FIGS. 2 and 4, the seal element 48 may be realized in any form that is suitable to provide a zero clearance seal between the conduit gripping member 34 and the second coupling member 14. One example of many is a seal configuration in which a face seal is provided between seal surfaces 50, 52 of the seal element 48 and facing seal surfaces 32 and 46, so as to form a zero clearance seal when the fitting 10 is adequately pulled-up.

In the exemplary embodiment of FIGS. 2 and 4, the seal element 48 may be realized in the form of a face seal gasket of conventional or special design, or as another alternative as shown, have a generally flat, thin washer-like body 54 with an annular sealing bead 56, 58 on either side and facing their respective face seal surfaces 46, 32. Preferably, the relative hardness between each sealing bead 56, 58 and its respective facing surface is such as to promote a good seal when the parts are axially compressed together. Whether the seal surfaces 50, 52 are harder than or softer than the respective facing surfaces 46, 32 is a matter of design option.

The seal element 48 need not have the sealing beads 56, 58 but instead may be flat or may have other features and shapes to promote a good face seal and zero clearance. As another alternative, the beads may be formed on the facing surfaces 44, 28. Other alternatives include but are not limited to using a seal element that is all metal, non-metal or a combination thereof. For example, an elastomer or plastic material may be included with the seal element 48 or with the facing surfaces 28, 44, or both, as needed and as compatible with the system fluid.

With continued reference to FIGS. 2 and 4, the seal element 48 may include a radially tapered collar portion 60 that forms a socket or recess 62. This socket 62 may be used to provide a locator position for the conduit end C1. The socket 62 is defined in part by a tapered and inwardly recessed wall 64 against which the conduit end C1 may abut to indicate to the assembler that the conduit is fully inserted into the fitting 10. The seal element 48 also may include a through passage 66 that is circumscribed by an interior cylindrical wall 68. The diameter of the wall 68 as well as the geometry and material of the seal 48 may be selected so that upon complete pull-up of the fitting, the wall 68 forms a bore line or near bore line continuity between the conduit cylindrical wall 26 and the body central bore 24, so as to reduce entrapment areas at the connection. The tapered wall 64 and cylindrical wall 68 converge at an annular edge 70. This edge 70 may be used to provide a seal area against the conduit end C1 if needed, either as a back-up seal for the bead 56 and the gripping member 34, or as a primary seal.

Figure 3:
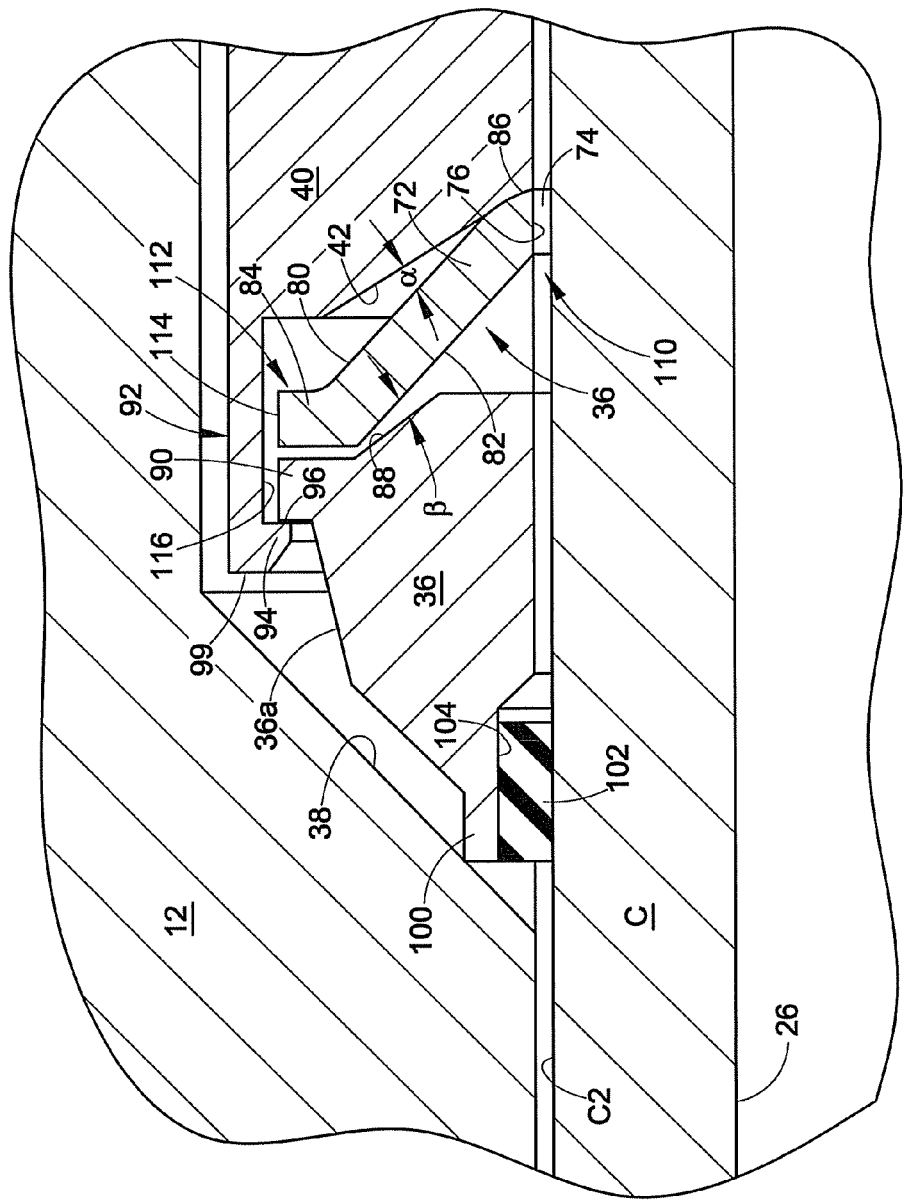
FIG. 3 is an enlarged view of the circled region of FIG. 2.

In the illustrated exemplary embodiment of FIGS. 1-3 and 5, and with particular reference to FIG. 3, the conduit gripping member 34 may be realized in the form of a conically shaped body 72 which in some respects may be comparable to a spring washer. Accordingly, the body 72 may include a central opening 74 that is defined in this example by a radially inner cylindrical wall 76, and that allows the conduit C to be slid there through during assembly of the fitting 10. A common example of a spring washer geometry is a Belleville spring, although such geometry is only exemplary. Belleville springs generally are used to provide a live-load or bias against a surface in a direction along a central longitudinal axis of the spring, in terms of FIG. 1 in a direction that is parallel to the axis X. Our concept in one embodiment is to use a spring washer approach to effect conduit grip and optionally a seal by a radial compression against the conduit outer surface C2 brought about when the spring is axially loaded. An axial load against the conduit gripping member 34 causes the spring to deform to a flatter condition, as compared for example to the spring in an unstressed condition, which produces an inward radial compression of the spring against the conduit C. This concept of using a spring washer to effectively grip and optionally seal against an outer surface of a conduit is fully described in International Patent Application number PCT/US2006/024776 published as WO 2007/002576 A2 on Jan. 4, 2007 and fully incorporated herein by reference.

In the embodiment of FIG. 3, the conically shaped body 72 comprises two generally and optionally parallel frusto-conical walls 80, 82 extend from the radially inner wall 76 to an optional radial extension 84. A typical Belleville spring does not use the extension 84, and the present inventions may be used with such conventional spring designs in many cases. The outer frusto-conical wall 80 and the inner cylindrical wall 76 converge at a front end or edge 86 of the spring washer 72. This front edge 86 may be but need not be a sharp edge, and preferably may be of such configuration and shape as to indent or embed into the outer surface C2 of the conduit when the fitting 10 is pulled up. During pull-up, in addition to the radial compression against the conduit outer surface, there is a slight axial movement of the front edge 86 as the spring begins to flatten. The front edge 86 is also radially directed against the conduit surface by engagement with the tapered or frusto-conical surface 42 of the face seal member 40. These movements cause the front edge 86 to indent or penetrate into the conduit outer surface C2 (see the discussion below relating to FIG. 5). By indenting into the conduit surface, the conically shaped body 72 will exhibit a high gripping strength against any tendency for the conduit C to try to back out of the fitting, especially under pressure. For lower pressure applications, however, it may not be necessary to have a biting or indenting type effect on the conduit. The conically shaped body 72 may have many alternative geometries and configurations to promote the grip and seal functions as needed and as needed for particular overall fitting 10 configurations and designs.

The gripping member 34 initially engages the interior surface 42 of the face seal member 40 down near the conduit surface, as illustrated in FIG. 3 in the finger-tight condition of the fitting. The interior surface 42 is frusto-conical so as to present a camming surface for the conically shaped body 72, and also to provide a limit on the deflection of the conically shaped body 72 during pull-up. The forward or outer frusto-conical wall 80 and the interior surface 42 may define an included suitable angle $\alpha$, while the rearward or inner spring wall 82 and an outer tapered frusto-conical surface 88 of the drive member 36 may define an included suitable angle $\beta$. In many cases, the angles $\alpha$ and $\beta$ may be the same or nearly the same, but in other cases they may be different, depending on the design and operation of the gripping member 34. The surfaces 88 and 42 cooperate to control deflection of the conically shaped body 72 in a manner desired to achieve the desired grip and optional seal against the conduit outer surface C2. This control of the deflection may be further enhanced with the use of the optional radial extension 84 that engages a corresponding radial extension 90 on the drive member 36. As the drive member 36 is axially moved against the conically shaped body 72, axial movement of the forward edge 86 is restricted by the face seal member 40, and so the conically shaped body 72 begins to flatten, which in cross-section appears as the walls 80, 82 moving towards a more vertical orientation. This causes in inward contraction of the cylindrical wall 76, in other words a decrease in its diameter, thus causing the forward edge 86 to indent or bite into the conduit, and for the cylindrical wall 76 in general to swage against the conduit C2. By swage is meant that the conduit surface is radially compressed to a smaller diameter, with either plastic or elastic deformation. In alternative cases, especially for lower pressure applications, it may be sufficient for the spring wall 76 to be compressed against the conduit to in effect collet with a radial load against the conduit outer surface, even if the compression is not as much as would be considered a swaging action. Because the conically shaped body 72 does not fully plastically deform and stores potential energy as it is flattened, we consider this design to be a live loaded, and further, the design allows for re-make of the fitting 10, in other words, a fully tightened fitting may be untightened and then re-made with the same resulting conduit grip and seal as needed. Note further that as system pressure increases, the pressure force tends to push the conduit back out of the fitting 10 (as viewed in FIG. 1, from right to left for example). For designs in which the conically shaped body 72 convex side faces the high side system pressure, this tendency for the conduit to attempt to shift out of the fitting results in the conically shaped body 72 becoming even more compressed, causing the conically shaped body 72 to indent further into the conduit and also grip the conduit surface tighter. We call this action an energized conduit grip because the gripping strength increases with increasing system pressure.

It should be noted that while the gripping member 34 illustrated herein is a spring washer type configuration, such is not required, and other annular ring-like conduit gripping and sealing members may alternatively be used.

The face seal member 40 may include an optional cylindrical extension 92 that extends rearward of the conduit gripping member 34, and shrouds about the conduit gripping member 34 and a portion of the drive member 36. The rearward extension 92 may include a hook 94 or similarly functioning and somewhat flexible member that can snap over a back end 96 of the drive member radial extension 90. This arrangement may be used to couple the drive member 36, the conduit gripping member 34 and the face seal member 40 together as a unified subassembly or preassembly 98 (FIG. 1) that may be use to simplify assembly or field use of the fitting 10 so as to reduce chances of improper installation. Techniques other than a clip together arrangement may be used to hold the parts together as a subassembly 98. A subassembly may also include additional parts or fewer parts as needed. For example, the seal element 48 may be included in a subassembly. Another alternative, in some cases the drive member 36 may not be needed, but rather the surface 38 of the nut may be used to drive the conically shaped body 72 against the face seal member 40. In such an alternative, the conduit gripping member 34 and face seal member 40 may be joined as a subassembly or optionally may include the seal element 48 as part of the subassembly. In any case, a subassembly of selected parts that has been fully tightened onto the conduit end will remain on the conduit end after disassembly, loosening, uncoupling or separation of the nut 12 from the body 14.

Figure 5:
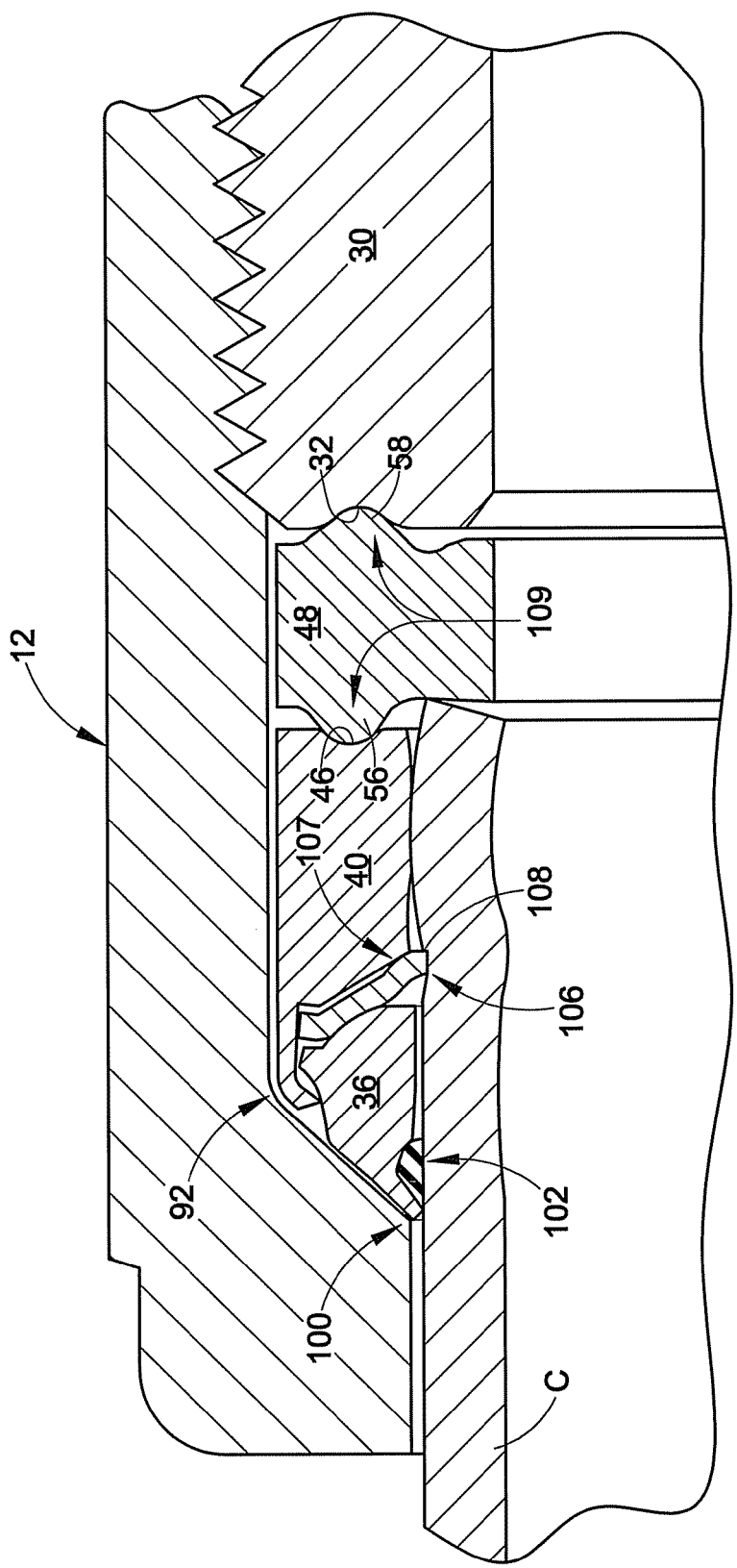
FIG. 5 is an enlarged illustration of the fitting of FIG. 1 in a completed pulled-up condition, illustrated in half-longitudinal cross-section.

The cylindrical extension 92 may also include an inner end surface 99 that optionally engages the nut drive surface 38 with a camming action that causes inward radial deflection of the hook or end 94 (see FIG. 5 also). This causes the hook or end to be crimped or compressed against the drive member 36, for example an optionally tapered outer surface 36a of the drive member. This assures that when a tightened fitting is subsequently loosened or disassembled, the face seal member 40 may remain assembled with the drive member 36 and gripping member 34 as a subassembly 98 on the conduit end.

The drive member 36 may further include an optional rearward cylindrical extension 100 that engages the nut drive surface 38 with a camming action that causes the extension 100 to inwardly deflect or crimp against the conduit outer surface C2 (see FIG. 5). This crimping may optionally include indenting into the conduit but is not required. An optional lubricating material, for example a resin or lubricant 102, such as for example, ultra-high molecular weight (UHMW) polyethylene or UHMW-PE, may be initially placed in the pocket 104 defined by the rearward extension 100. After complete pull-up, the lubricating material is squeezed or displaced into the contact region between the crimped extension 100 and the conduit surface C2. The lubricating material serves to reduce the effects of abrasion and fretting of the conduit surface that may occur as a result of vibrations and bending moments in the conduit.

With reference to FIG. 5, we illustrate an exemplary configuration of the fitting 10 in a fully pulled up and tightened condition. It will be noted that the gripping member 34 is somewhat flattened sufficiently to achieve the desired conduit gripping force by swaging in the region 106 the now smaller cylindrical wall 76 onto the conduit. In some cases this may include forming a shoulder 108 by biting into the conduit surface. This shoulder 108 will press against the front edge 86 of the gripping member 34 in response to pressure which will help prevent the conduit from backing out, and as pressure increases will cause the gripping member to grip even tighter due to further flattening of the gripping member 34. The rearward cylindrical extension 92 of the face seal member 40 has been crimped over the drive member 36, and the rearward cylindrical extension 102 has been crimped onto the conduit, with the lubricating material 102 displaced into the crimped region. The seal element 48 has also been axially compressed between the facing seal surfaces 32, 46 so that the beads 56, 58 form zero clearance face seals therewith. The beads 56, 58 are illustrated with an exaggerated indenting in to the surfaces 32, 46 for ease of understanding. In all the drawings herein, various gaps, spaces and alignments may be somewhat exaggerated for ease of illustration and clarity.

The indented gripping member 34 thus provides grip and seal along the outer conduit surface (for example in the region generally indicated with the numeral 106), the gripping member 34 also provides a seal against the face seal member surface 42 as in the region generally indicated with the numeral 107, and the seal element 48 provides zero clearance seals 109 with the face seal member 40 and with the body end portion 30. These seals provide a fully sealed connection between the conduit end C and the fluid flow path through the body 14.

In order to further increase the pressure rating of the fitting 10, various parts or surfaces may be treated to be surface hardened as compared to the core material. One exemplary suitable process is low temperature carburization which produces a hardened surface that is substantially free of carbides in stainless steel alloys, however, other hardening processes including work hardening and non-low temperature carburizing, nitriding and others may be used as needed based on the desired hardness and corrosion resistance properties needed for a particular application. For example, for a stainless steel fitting 10, it may be desirable to surface harden the beads 56, 58 or the seal surfaces 50, 52 (FIG. 4). It may also be desirable in some designs to harden the entire surface of the conduit gripping member 34, or alternatively the inward portion 110 (FIG. 3) that will indent into and compress against the conduit C. This may be especially useful when the conduit comprises a hard alloy material, such as 2205 or 2507 duplex stainless steel, to name a few of many examples. It may also be desirable in some applications to harden the outer portion 112 of the gripping member 34 (FIG. 3), because just as the inner diameter of the spring washer 72 tends to decrease as the spring is flattened, the outer diameter tends to increase. By hardening the outer portion 112 this tendency to increase the diameter of the spring washer 72 will be lessened. The fitting may also be designed so that the outer rim 114 of the spring washer 72 engages and is radially constrained by the inner surface 116 of the rearward cylindrical extension 92 of the face seal member 40.

During pull-up, the nut 12 axially advances, relative to the fitting body 14, and somewhat flattens the conduit gripping member 34 to indent into the conduit surface, and also effects the radial face seal between the face seal element 48 and the face seal member 40 and the body 14. The body 14 may be, for example, a standard SAE face seal design that would normally accommodate, for example, an o-ring face seal. The face seal member 40 has an opposite surface 42 adjacent to the spring 34, having an angle α with the free and non-flexed conduit gripping spring (in a finger-tight condition such as FIG. 1), and participates with the flattening of the conduit gripping member 34 during pull-up. Opposite the conduit gripping member 34 is the drive member 36 such as a gland, likewise having an appropriate surface 88 (FIG. 3) adjacent to the conduit gripping member 34 with an angle β, which also participates with the flattening of the spring during pull-up while the pull-up also effects the face seal.

The face seal member 40 has the optional rearward extending cylinder 92 that shrouds about the conduit gripping member 34 and much of the drive member 36. The end of the rearward extending cylinder 92 optionally has a radially inward hook that snaps over a radial shoulder 90 on the drive member 36. When snapped together, the drive member 36, gripping member 34, and face seal member 40 form a sturdy cartridge sub-assembly 98 that can be handled, stored, and inventoried as a single unit. As such, within this cartridge 98 prior to pull-up, the gripping member 34 is in its free and un-flexed state. When used, the cartridge 98 may be placed in the nut 12 which is then assembled to the body 14. The conduit end is inserted into the end of the nut 12, through the cartridge sub-assembly 98, and up against the zero clearance face seal element 48. The nut is advanced to create (a) a sealing grip on the conduit, by virtue of flattening the gripping member 34, and (b) a zero clearance face seal on the body 14. In the course of pull-up, the camming drive surface 38 of the nut crimps the end 94 of the rearward extending cylinder radially and more firmly onto the drive member 36, particularly onto an included surface 36a on the drive gland. The drive member 36 may have the optional smaller rearward extending cylinder 100 that shrouds about the conduit upon assembly. Within the smaller rearward extending cylinder may be a deposit of resin or other suitable lubricant material 102 applied along the circumference of the inside diameter of the smaller rearward extending cylinder. Upon pull-up, the camming drive surface of the nut likewise crimps the end of this smaller rearward extending cylinder radially and onto the surface of the conduit. The lube material 102 is displaced onto the conduit surface and into the contact zone between conduit and the crimped end of the smaller rearward extending cylinder. This lubed crimping action creates a resistance to potentially damaging effects of fluid system vibration. Should the fitting become disassembled, for maintenance of the fluid system or for other purposes, the cartridge sub-assembly 98 stays fixed on the end of the conduit. The nut, captured on the conduit end by the cartridge sub-assembly, is free to slide back on the conduit. This fitting is said to have a zero-clearance design because the body can then be lifted radially away from the conduit end without having to first pull the conduit end axially out of the body. When the fitting is re-assembled (after fluid system maintenance, for example) the nut is slid back over the conduit gripping cartridge sub-assembly 98 and pulled-up on the body. Fluid seals are re-established on the conduit surface and at the body face seal. This fitting design has the further advantage of tighten-ability. Should the fitting develop a leak (due to any of a number of reasons including insufficient pull-up) the nut can be tightened further onto the body such that the sealing members engage further and shut-off the leak.

As noted, the conduit gripping member 34 may have a basically conical shape, also called a Belleville or Belleville-like spring, which has a central hole 76 or inner diameter through which a conduit can pass. Pressing the spring axially so as to flatten it causes that central hole to decrease in diameter such that its edge indents into the surface of the conduit and grips the conduit in place. Configured in a conduit fitting, the flattening of a gripping spring is accomplished by pulling-up or advancing the nut relative to body such that surfaces adjacent to the gripping spring would impart a toroidal flexure or flattening of the gripping spring. These adjacent surfaces start out having an angle α and β with the free and non-flexed conduit gripping spring, touching the spring generally at its radially inner most convex surface, and at its radially outermost concave surface. The gripping spring is configured in the conduit fitting with the convex side toward the source of system fluid elevated pressure. The gripping spring maintains some amount of convexity toward the source of pressure, even after fitting pull-up. As that pressure attempts to push the conduit out from a pulled-up fitting, the inner diameter of the conduit gripping spring embeds deeper into the conduit surface. This provision of a greater grip in response to a greater pressure load to push out the conduit is called an energized conduit grip, a grip that increases to meet an increased conduit gripping requirement due to increasing system fluid pressure.

Embodiments that use a spring-like washer for the conduit gripping member 34 may be used to effect various advantages for the fitting designer. The spring-like member 72 may be tightened to a fully pulled-up condition as in FIG. 5 with a rather short stroke or displacement of the nut 12 relative to the body 14. For example, the embodiment of FIG. 1 may be fully made up with only a half-turn or even a quarter-turn of the nut relative to the body. The use of the generally flat gripping member(s) 34, even if more than one is used in a stacked configuration, provides a compact fitting design. The controlled deflection of the spring also facilitates the use and design of these fittings for thin walled conduits, as well has heavy walled conduits.

Figure 6:
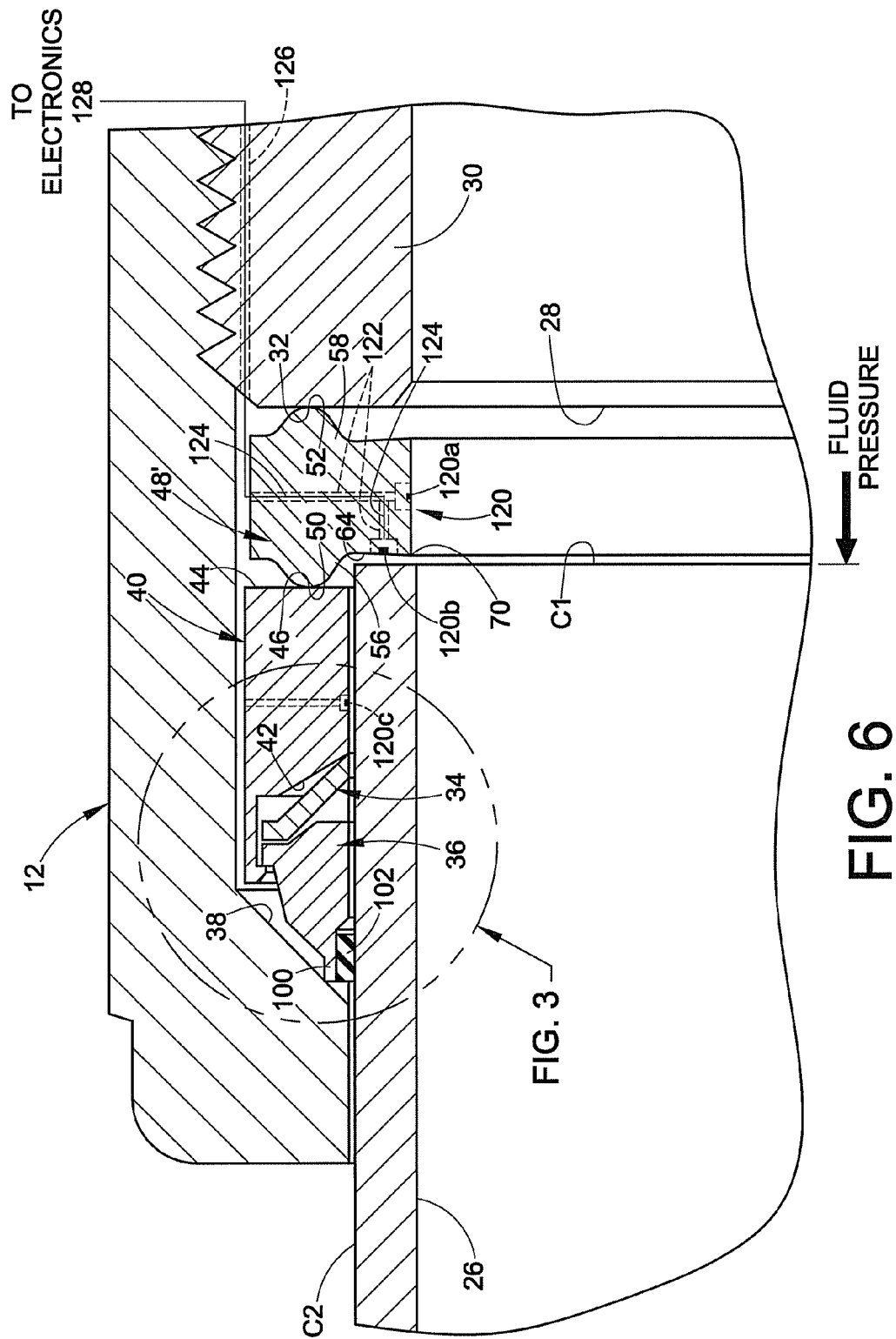
FIG. 6 is another embodiment of the assembly illustrated in FIGS. 1 and 2, including a sensing function in accordance with another invention disclosed herein.

Turning now to FIG. 6, we further contemplate as one of our inventions the realization of a 'smart fitting', meaning that a fitting or assembly for a mechanically attached connection includes a sensing function that may provide information or data to an analytical function or process about the health, properties, assembly, condition and status of the assembled fitting, one or more of the fitting parts, the fluid contained by the fitting, or any combination thereof. In the present disclosure, an embodiment as illustrated in FIG. 6 includes a sensing function that is incorporated into or otherwise associated with the seal element 48' that is provided to form a zero clearance seal for the fitting 10. We use the prime (') notation in FIG. 6 for the seal element because the basic configuration and function of the seal element 48' may be but need not be the same as was used for the embodiments of FIGS. 1-5. As will be readily apparent from the further discussion below, additional or alternative sensing functions may be introduced into the fitting 10, including many different ways to structurally introduce sensing functions in the fitting.

The present inventions are not limited to any particular fitting design or configuration, and also are directed to the idea of introducing into or including with such fittings a sensing function. Due to the sometimes highly complex and numerous uses of fittings in a fluid system, it may be desirable to be able to sense one or more conditions, or collect data and information, regarding the assembly, performance or health of a fitting or the fluid contained by a fitting or both. With so many fittings already in use, easily numbering in the billions, the present inventions provide apparatus and methods for introducing sensing functions into an existing fitting design, an installed fitting design, or providing a sensing function as part of a new fitting or fitting installation, repair, retrofit or as part of a maintenance operation. With the ability to provide ubiquitous and facile installation of a sensing function with a fitting, the fluid system designer may develop all different types of control and monitoring systems 128 to utilize the data and information collected or obtained right at the fitting site, including as needed on a real-time basis. The control and monitoring system or circuit 128 may be conveniently disposed outside the fitting, even in a remote location, and use wired or wireless communication links with the sensor to receive the data and information provided by the sensor. Alternatively the circuit 128 may be integrated with the fitting itself, such as on an exterior surface for example. By 'remote' is generally meant that the circuit 128 is away from the fitting, and may be at a distance from the fitting, but the term is not intended to imply nor require that it must be a great distance or even beyond line of sight, although in some applications such longer distance communication may be desirable, either in a wired or wireless manner. Some sensors may be interrogated by circuits that are handheld within a close remote location or range such as a foot or less for example. An RFID (Radio Frequency Identification) tag is a common example of such a device.

A fitting with a sensing function can be considered a 'smart fitting', meaning that a fitting or assembly for a mechanically attached connection includes a sensing function that may provide information or data to an analytical function or process about the health, properties, assembly, condition and status of one or more of the fitting components, the fluid contained by the fitting, or both. In the present disclosure, the exemplary embodiments as illustrated herein include a sensing function that is incorporated into or otherwise associated with a component or part or member of the fitting, or added to a fitting by means of a sensor carrier or substrate that is provided to position a sensing function in the fitting to perform its designed function.

Although in the FIG. 6 embodiment the sensing function is associated with the seal element 48', those skilled in the art will readily appreciate that one or more sensors and sensing functions, whether wetted or non-wetted type sensors, may alternatively or in addition to the seal element sensor, be associated with other fitting members such as, for example, the drive member 36, the face seal member or gland 40, the nut 12, the body 14, the conduit gripping member 34 or even the conduit C. As an example, we show a sensor 120*c* associated with the face seal member or gland 40 (FIG. 6). The seal element 48' does provide a simple and fast way to introduce a sensing function into a fitting, whether the fitting is a new assembly, an assembly already installed in a fluid system, or for retrofit, repair or maintenance. Use of installable sensing functions allows a designer to provide a common fitting design that can be made "smart" simply by introducing the sensing function into an installable component such as the seal element for example. For example, even after a fitting has been installed into a fluid circuit, the fitting can be made smart by introducing one or more sensors into the fitting, can have one or more sensors removed, or have different sensors added or removed. For example, internal sensors may be installed by first disassembling a tightened fitting sufficiently to gain access to whatever structure is needed to install a sensor, such as for example swapping out a sensor-less gasket for a gasket having a sensor. Or perhaps the installer may decide to add an external or internal temperature or pressure sensor when it is discovered that temperature or pressure sensing is needed that was not known before at a particular fitting or location in the fluid circuit. These are just a few examples of the many options made available by the inventions herein by having fitting designs that facilitate use of sensing functions with the fitting. Use of a sensing function in an installable part also facilitates postponement of final fitting configuration to the field, which allows for more efficient inventory control since an end user would not need to stock both "smart" and regular fittings. Alternatively or additionally, the sensing function may be incorporated into or integrated with one or more of the various parts of the fitting.

In the exemplary embodiment of FIG. 6, the seal element 48' may include one or more sensors 120 that are attached to, integrated with or otherwise associated with the seal element 48'. The sensors 120 may take a wide variety of forms and functions. Each sensor 120 may be a wetted sensor 120*a* meaning that a portion of the sensor is exposed to the system fluid passing through the fitting 10, or a non-wetted sensor 120*b* that is not exposed to the system fluid, or a combination thereof. A sensor may be used, for example, to sense, detect, measure, monitor or otherwise collect information or data about a property or characteristic of the mechanically attached connection, for example, general leakage, conduit bottoming, changes in stress, or vibration to name a few examples; one or more fitting components such as the coupling components, conduit gripping member(s), seals and so on; and/or the fluid contained by the mechanically attached connection or fitting, or any combination thereof. A wetted sensor 120*a* may sense, for example, pressure, temperature, galvanic effects, fluid density, refractive index, viscosity, optical absorbance, dielectric properties, flow rate, conductivity, pH, turbidity, thermal conductivity, moisture, gas or liquid specific properties and so on to name a few examples. Examples for a non-wetted sensor 120*b* may include, pressure, temperature, seal integrity, leakage, leak rate, stress and stress profiles, vibration, tube bottoming and so on.

The zero clearance fitting concept herein provides an exemplary structure for optionally introducing a sensing function into a mechanically attached connection. This allows the designer to incorporate a sensing function when needed or to omit the sensing function by either not connecting to the sensor or using a seal element that does not include a sensor in its structure. This allows a sensing function then to be added into a fluid system even after a non-sensor fitting has been installed, simply by replacing the seal element 48 with a seal element 48' having the sensing function associated therewith. By having a fitting design, whether zero clearance or not, that may optionally receive a sensing function, the end user may decide which fittings will be smart, thus allowing postponement of final fitting configuration to the field. Such postponement may offer significant advantages in terms of inventory management and design optimization for the fluid system.

It should be noted that the locations of the sensors 120*a*, 120*b* illustrated are exemplary and will be selected as a matter of design choice based on what the sensor function and configuration will be. Additionally, the sensors may be embedded in the seal 48' body or surface mounted or otherwise attached or integrated with the seal 48'. For example, the non-wetted sensor 120*b* may be recessed in a surface such as with a counterbore of the seal 48' so that it can measure stress or pressure of the conduit end CI against the seal pocket 64 to detect or sense bottoming of the conduit C in the fitting.

The sensors 120 may operate in many different ways, including but not limited to electromagnetic, acoustic-magnetic, magnetic resonance, inductive coupling including antenna, infrared, eddy current, ultrasonic and piezoelectric. The sensors 120 may communicate in a wired or wireless manner with the latter including but not limited to BLUETOOTH™, Wi-Fi, 2G, 3G, RFID, acoustic, infrared, and optical. In the FIG. 6 embodiment, the sensors 120 are wired. Recesses or passages 122 may be formed in the seal 48' through which wires or conductors or other communication links 124 such as optic fibers may be routed out of the fitting 10. The threaded nut and body connection may include a groove or axial hole or other path 126 positioned below the minor diameter of the threads to allow the communication link to be routed outside the fitting 10 to electronics 128 that will process the sensor information and signals.

The sensors 120 may be incorporated into the seal 48' by any number of suitable techniques, including but not limited to adhesive, painting, embedding, sputtering, metal injection molding, casting, compression, etched, printed and so on.

There is a wide variety of sensors commercially available today that may be used for various sensing functions. Undoubtedly, many more sensors will be developed and commercialized during the coming years, especially sensors that will have greater functionality, significantly small footprints, alternative installation and integration capabilities and communication functionality. The present inventions contemplate and facilitate the use of such sensors known today or later developed, in fittings as described herein.

Examples of commercially available sensors include but are not limited to the following: Micro-miniature absolute pressure sensor model 32394 available from Endevco Corporation. This is a silicon MEMS device that can be substrate or surface mounted with a conductive epoxy. Another pressure sensor or transducer is the model 105CXX series available from PCB Piezotronics, Inc. These sensors are in very small packages or may be re-packaged as needed for a particular application, and operate with piezoelectric technology. Liquid flow meters such as models SLG 1430 and ASL 1430 available from Sensirion AG. Miniaturized seismic transducers, motion transducers and angular rate sensors available from Tronics Microsystems SA. Tilt and vibration sensors, angle sensors, MEMS inclinometers, MEMS vibration sensors and MEMS accelerometers models SQ-SENS-XXXX, SQ-SIXX, SQ-PTS, SQ-SVS and SQ-XLD respectively, available from Signal Quest, Inc. Piezoelectric accelerometers model TR1BXN having temperature sensing capability, available from OceanaSensor, Virginia Beach, Va. Thermal sensors models LM and STXXX (numerous variations) available from ST Microelectronics. Thermistors, IR temperature sensors, gas tube arresters and varistors available from Semitec USA Corporation. Linear displacement sensors models M, MG, S, SG and NC type DVRTs available from MicroStrain Inc. Proximity switches available from COMUS International.

The above are but a few examples of miniaturized sensors available that may be used with the present inventions. The present inventions facilitate and enable such sensor technology to be incorporated into fittings and mechanically attached connections. Reference may be made to the manufacturer's web pages for additional product information. While the basic product literature may illustrate specific packaging concepts, the sensors may be either repackaged or alternatively integrated with a fitting component or member in accordance with one or more of the various inventions herein.

SENSOR INTEGRATION, WETTED—The sensors 120 may be embedded on the wall surfaces of the seal element 48'. Embedding methods may include but are not limited to resin potting, powder metal sintering, or brazing. Wetted sensors 120*a* may be used to monitor fluid system pressure, temperature, and other fluid parameters. As another example, a wetted sensor may be used as a flow sensor. In the flow sensor case, small wetted flow sensors are available from Sensirion. Flow sensors may utilize tuned conduit geometry, such as, for example, including a tuned insert into the fitting. Sensors 120 placed on the wetted surfaces of end fitting tube sockets 64 may also be used to monitor tube bottoming and extent of fitting pulled-up condition. For example, a proximity sensor may be used to detect conduit bottoming or also position of the conduit gripping device or devices to verify pull-up. A wetted sensor can be paired with another sensor (not shown), a non-wetted sensor for example, to facilitate a wireless communication from the first sensor to the other sensor. In other alternative embodiments, wireless wetted sensors may be disposed or integrated with wetted surfaces of the various fitting components, and wirelessly communicate through a wall of the component. This may avoid the need to breach the pressure containment structure of the fitting. But in lower pressure or benign applications, wired sensors that do breach the pressure containment structure may be used. This concept may be applied not only to non-metal components, but also metal components including but not limited to 316 stainless steel. The component material will in part determine the wireless frequency needed, along with the thickness of any wall that the wireless signal must penetrated to be picked up by appropriate electronic circuits that receive and process the wireless signals. As still another alternative, miniature microphones and accelerometers from Akustica may be used in the fitting to detect vibration, leakage or the onset of leakage when variations in the acoustic signatures are detected.

SENSOR TECHNOLOGY—The sensors 120 may comprise a film that is pressure sensitive and changes color with changes in pressure. Photonics sense the color, the indication of pressure, and an optic fiber or other device may be used, for example, for sensor signal transmission to the electronics 128. The sensors 120 may alternatively comprise a force sensitive molecular structure which has a characteristic resonance that is proportional with applied force. That resonance can be detected by a remote scanner for example, such as a RF wand. The sensors 120 may alternatively comprise a dual diaphragm for detecting a spaced differential of a physical property (e.g. pressure differential, strain differential, capacitance). A common detection technique may be use of photonics that sense both diaphragms and detects a response difference (reflection, refraction, or intensity shift) proportional to physical property differentials or change in the diaphragms.

The sensors 120 may be integrated onto the wetted surfaces of the generally circular ring or hoop-like seal element 48'. The sensors 120 may be integrated onto the seal 48' inside diameter surfaces or on radial surfaces that when assembled in the fitting 10 will be wetted by system fluids. The sensor elements may be laminated, printed, attached, adhesively applied or equivalently applied or otherwise applied directly to the seal 48' surfaces. The seal 48' may comprise a split-ring assembly or seal insert to enable direct printing or applying of sensor elements to the seal element inside diameter surfaces. Where axial orientation of the sensor is important, for example sensors for fluid flow, these seal inserts may be keyed to axially differentiated slots or grooves on the seal. The seal 48' may be keyed directionally using counterbores, circumferential shoulders, or the like to match directionally keyed structures on the fittings, particularly face seal fittings. The sensors 120 that are integrated into the seal 48' may be hard wired connected to the electronics 128 or other sensors or both, and thus may comprise leads or equivalent to external surfaces to hard wire the sensor from outside the containment of system fluids. Such leads form a composite with the seal such there is no compromise of system fluid containment or seal integrity. Sensors integrated into the seal 48' may comprise leads or equivalent to provide external antenna for the sensors. Here also, such leads form a composite with the seal such there is no compromise of system fluid containment or seal integrity. Sensors integrated into seals, whether fully passive or powered by built-in battery or fuel cell, may alternatively comprise no leads to external surfaces, and thus no compromise of system fluid containment or seal integrity.

The inventions herein include methods for mechanically connecting a conduit to another fluid member, with the methods fully set forth above in the description of the exemplary embodiments. One such method comprises connecting a conduit to a fluid member by forming a conduit gripping connection and a zero clearance seal in an exemplary manner as set forth above. In another embodiment, the method may include providing a sensing function that is associated with the zero clearance seal.

The electronics 128 (FIG. 6) may be operably coupled to the sensors 120 in many different ways, including wired and wireless connections. Wireless connections may include electromagnetic coupling such as by antenna, or optical coupling, acoustic and so on. The specific circuits used in the electronics 128 will be selected and designed based on the types of sensors 120 being used. For example, a strain gauge may be used for a non-wetted sensor 120*b*, and the strain gauge will exhibit a change in impedance, conductivity or other detectable characteristic or condition. The electronics 128 may provide a current or voltage or other energy to the strain gauge, across a wired connection or wireless connection for example, so as to detect the strain gauge condition of interest. Similarly, the electronics 128 may interrogate or detect a temperature or pressure sensor condition, or the electronics 128 may receive signals transmitted from the sensor that encode or contain the information or data of interest produced by the sensor. These are just a few examples of the wide and extensive variety of sensors and electronics that may be used to carry out the inventions herein.

Figure 7:
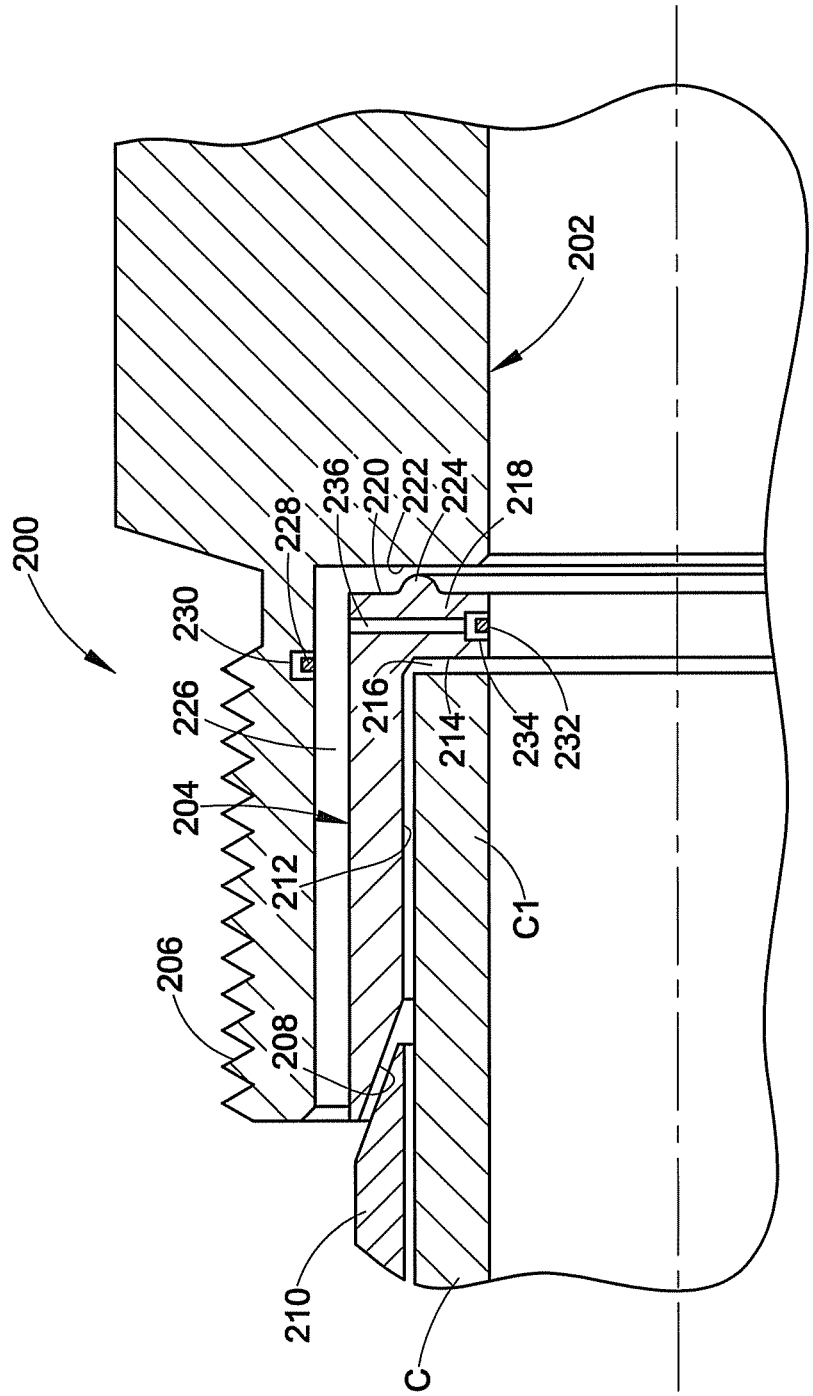
FIG. 7 is an embodiment of a split body fitting with an optional sensing function, in half longitudinal cross-section.

With reference to FIG. 7, illustrated in longitudinal cross-section (only half of the overall fitting is illustrated for convenience) is another embodiment of a fitting with an optional sensing function. In this embodiment, the body coupling member (by 'body' is meant the coupling member that includes a socket that receives a conduit end) 200 may be split into two constituent parts, a threaded main body 202 and a conduit socket insert 204. The assembled body 200 may mate with a nut (not shown) such as the nut 12 of the above described embodiments or another nut configuration. The main body 202 may include a male threaded end 206, although non-threaded couplings may also be used as needed.

The socket insert member 204 may include an outer end having a frusto-conical camming surface 208 that engages a conduit gripping member 210 during pull-up. The fitting 200 may use a single or plural conduit gripping members as needed. The socket insert member 204 may further include a first generally cylindrical wall 212 that along with a first generally radial wall 214 forms a socket 216 for the conduit C end C1. The socket insert member 204 may further include a radial flange 218 that presents a first face seal surface 220 which faces a second face seal surface 222 on the main body 202. Any suitable seal arrangement may be used, in this exemplary embodiment a sealing bead 224 may be provided to effect a face seal between the insert 204 and the main body 202 after a complete pull-up. This seal is needed due to the split body design.

Although exaggerated for clarity in FIG. 7, a small gap 226 will be present between the insert 204 and the main body 202. This gap may be used to route sensor wires out of the fitting 200 as needed. For example, an optional leak detector sensor 228 may be provided in a recess such as a counterbore 230 to detect fluid leaking past the face seal formed at the bead 224. Another optional sensor 232 may be provided in a recess such as a counterbore 234 in the insert member 204. This may be a wetted sensor for example used to sense flow, temperature or other characteristics of the fluid. The recess 234 may alternatively be a blind bore (not shown) into the insert 204 so as to form a thin wall separating the sensor 232 from the fluid, in order to provide a non-wetted sensor. A connecting bore 236 may be provided to route wires from the sensor 232 to the outside environs, or wireless sensors may alternatively be used.

In accordance with one aspect of this embodiment, the use of a split body allows a fitting designer to choose whether to incorporate a sensing function into the fitting 200. An insert 204 may be used that includes a sensing function or an insert may be used that omits the sensing function. The split body 202 may be conveniently designed to cooperate with conventional or custom designed conduit gripping members, conduits and mating nuts or other components.

Figure 8:
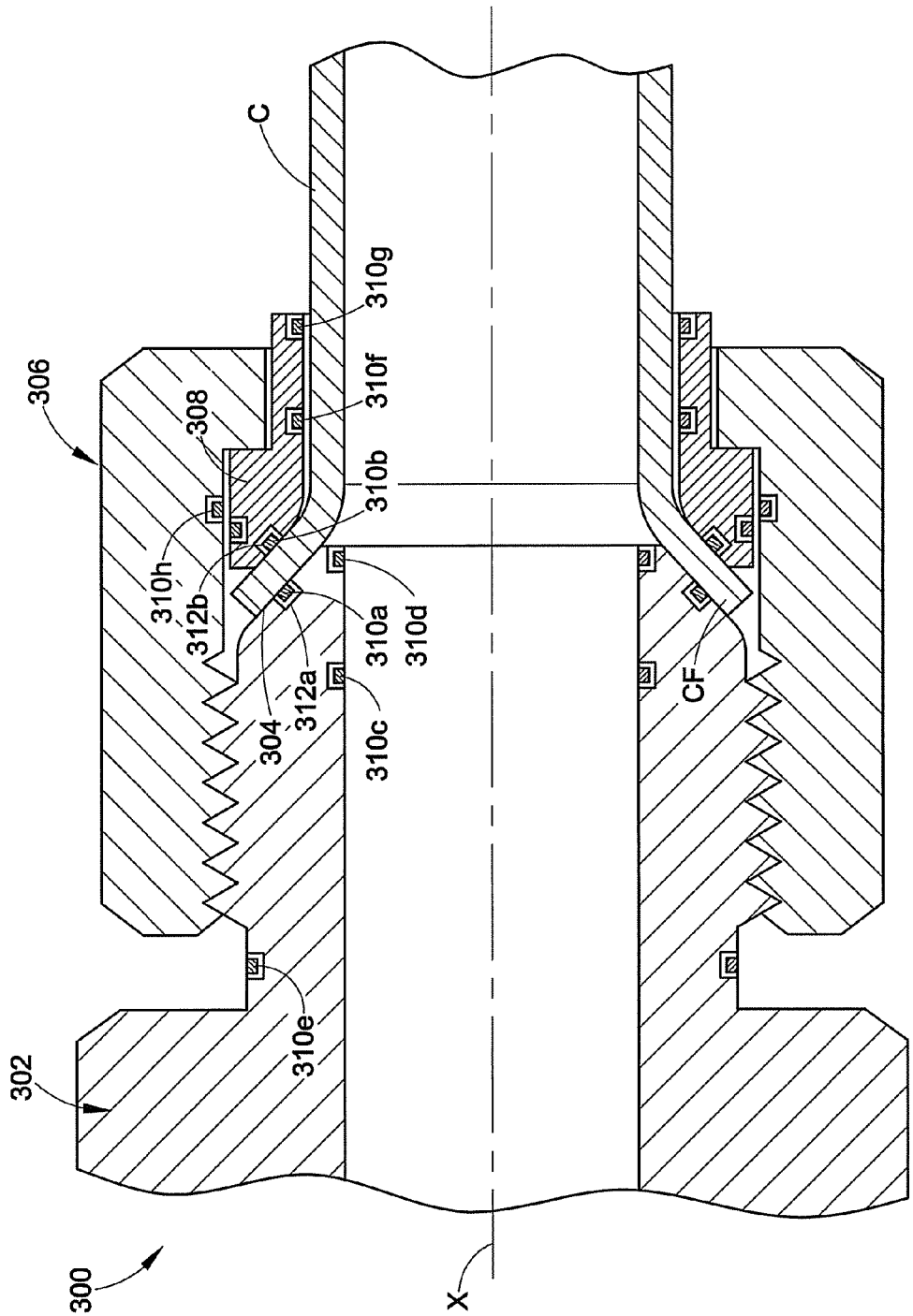
FIG. 8 is an embodiment of a flared conduit fitting with a sensing function in full longitudinal cross-section.

With reference to FIG. 8, a fitting 300 for a flared conduit is illustrated and includes one or optionally more sensing functions. The fitting 300 may be conventional in design or designed for a particular application and performance criteria, but in general such a fitting may include a body 302 having a tapered forward end 304. A nut 306 cooperates with the body 302 to pull-up the fitting to a fully made up condition as illustrated in FIG. 8. The nut 306 may also cooperate with an optional gland member 308. The gland member 308, when used, applies a compressive force to the flared conduit end CF against the tapered surface 304 of the body to form a fluid tight seal. For fittings that do not use a gland, the nut typically will have a drive surface that compresses the conduit end against the tapered surface of the body.

FIG. 8 illustrates in an exemplary manner how many different types of sensors 310 may optionally be used to incorporate various sensing functions into the fitting. For example, sensors 310*a* and *b* may be disposed in recesses or counterbores 312*a* and *b* to detect compressive stress against the body tapered surface 304 or the gland 308. Various wetted sensors 310*c* and *d* may be used to check fluid properties such as temperature or other properties as needed. Other sensors 310*e, f, g* and *h* may be used for verifying proper pull-up, vibration, and pressure such as with strain gauge type sensors, proximity sensors and so on, as well as to check for leaks. Again, these sensors may be wired or wireless, and integrated into the fitting in many different ways. The specific properties of the fitting components or the fluid contained by the fitting will be determined in part by the location of the sensor.

Figure 7A:
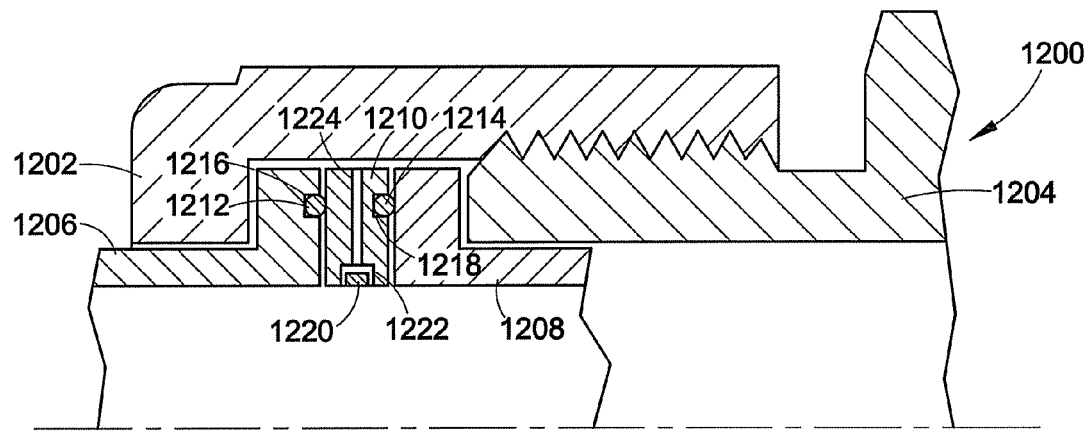
FIGS. 7A-7D are additional embodiments of face seal configurations with a sensing function, illustrated in half-longitudinal cross-section.

With reference next to FIGS. 7A-7D we illustrate alternative embodiments for face seal configurations, which may but need not be in all cases associated with a zero clearance fitting, having a sensing function or functions associated therewith. In FIG. 7A, a zero clearance fitting 1200 may include a threadably coupled nut 1202 and body 1204, first and second glands 1206, 1208 and a seal or gasket 1210 that is sandwiched between facing surfaces of the glands. The glands typically are welded or otherwise connected in a fluid tight manner to respective conduit ends (not shown). Compressible seals 1212 and 1214 may be used as needed to effect fluid tight face seals. The seals 1212, 1214 may be, for example, elastomeric o-ring seals, but any suitable seal may alternatively be used. O-ring type seals typically are disposed in respective seal grooves 1216, 1218. When the nut and body are tightened together, the gasket and o-rings are compressed axially to form a fluid tight mechanical connection. A typical commercially available example of the fitting 1200 is available from Swagelok Company, Cleveland, Ohio. In this embodiment, a sensing function may be provided by associating one or more sensors 1220 with the gasket 1210. The sensors may be as described herein or others. In the illustrated example, the sensor 1220 is a wetted sensor disposed in a counterbore 1222 or disposed on a surface of the gasket. Non-wetted sensors may alternatively be used, and one or more wetted or non-wetted sensors may optionally be associated with either or both glands, the nut or the body. Non-threaded couplings between the nut and body may also be used. For wired sensors, passages 1224 may be provided to route the wires, or wireless sensors may be used.

Figure 7B:
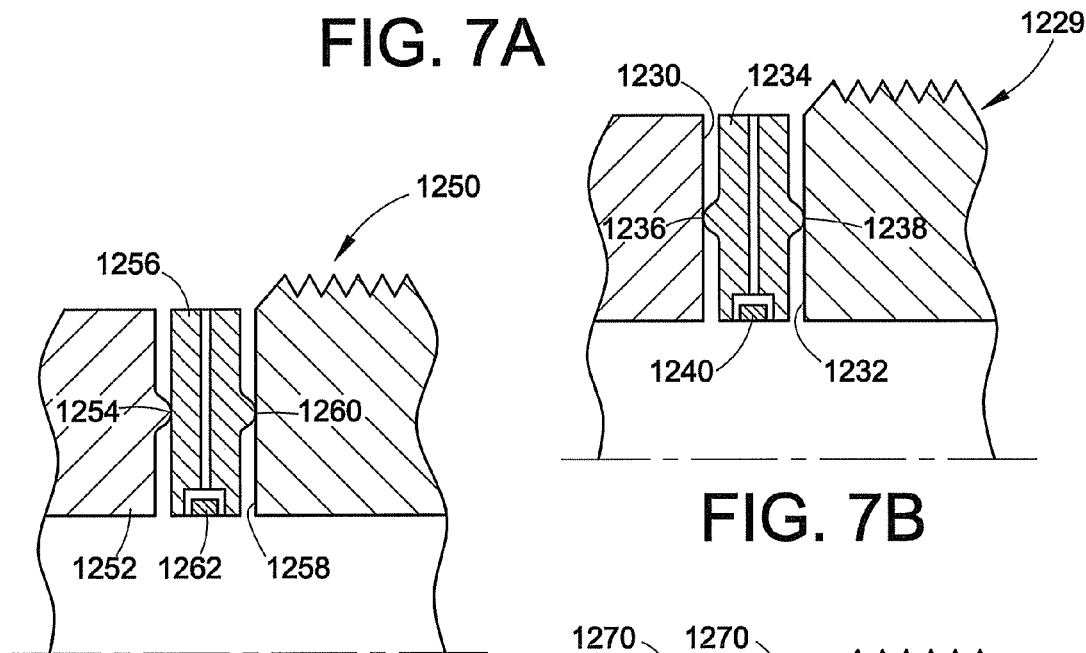

FIG. 7B illustrates a conventional SAE type face seal end connection 1229 in which first and second SAE ends 1230, 1232 compress a gasket 1234 having sealing beads 1236, 1238. The gasket 1234 or either or both of the SAE ends may be provided with one or more wetted or non-wetted sensors 1240, such as a surface mounted sensor for example. The sensors may be as described herein or others.

Figure 7C:
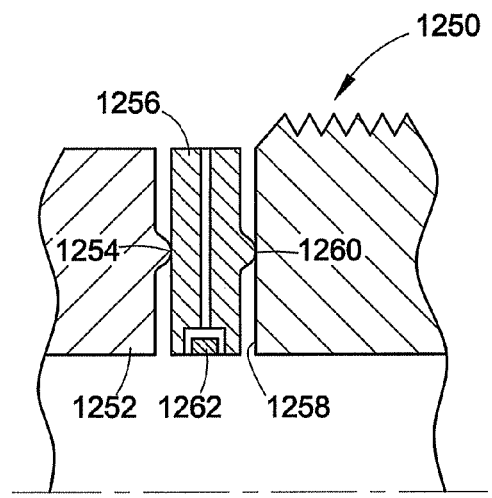

FIG. 7C illustrates another connection for an SAE end face seal fitting 1250 that includes a different sealing arrangement for the gasket. In this example, a gland or end 1252 may be provided with a sealing bead 1254. A gasket 1256 is sandwiched between the ends 1252, 1258 and the gasket may also include a sealing bead 1260 that seals against the SAE end 1258. The gasket 1256 may include one or more wetted or non-wetted sensors 1262, and the ends 1252, 1258 may also include one or more wetted or non-wetted sensors as described herein or others. In FIG. 7C the end 1252 may be, for example, a conduit gripping member.

Figure 7D:
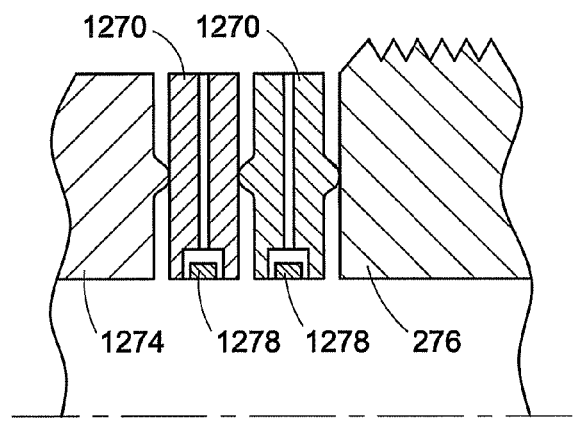

In FIG. 7D, the SAE end face seal fitting a multi-piece gasket may be used to accommodate more sensors for example. In this example, a first gasket 1270 and a second gasket 1272 are compressed between a first end 1274 and a second end 1276. The first end for example may be a conduit gripping member and the second end may be an SAE end. The gaskets or ends or both may be provided with wetted or non-wetted sensors 1278 as described herein or others.

Figure 8A:
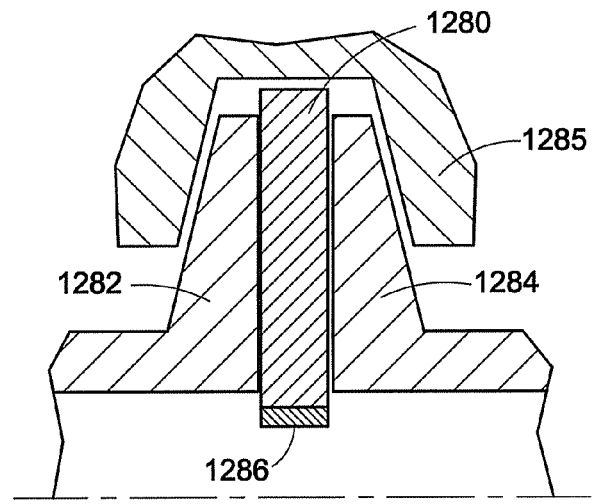
FIG. 8A is an embodiment of a sanitary fitting with a sensing function, illustrated in half-longitudinal cross-section.

FIG. 8A illustrates a conventional and well known sanitary fitting that uses a gasket 1280 compressed between two glands 1282, 1284 by a clamping mechanism 1285 as is well known. The two glands 1282, 1284 include tapered driven surfaces that contact a circumferential clamp such that when the clamp is tightened radially the glands are driven together and compress the gasket between them. A commercial example of a sanitary fitting suitable for use with these inventions is a T-Seal available from Swagelok Company, Cleveland, Ohio, however FIG. 8 herein is not representative of the T-Seal product but rather a different sanitary fitting design.

Figures 9A, 9B:
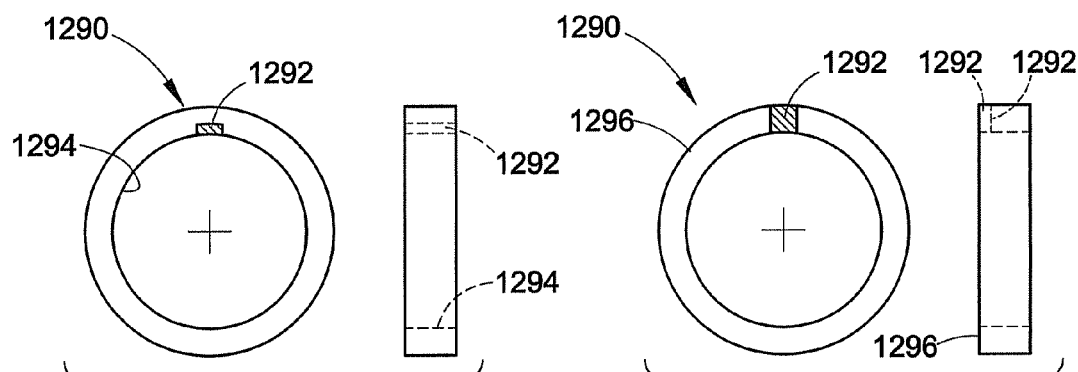
FIGS. 9A and 9B illustrate a gasket or sensor carrier embodiments that may be used to position a sensing function in a fitting.
Figure 10:
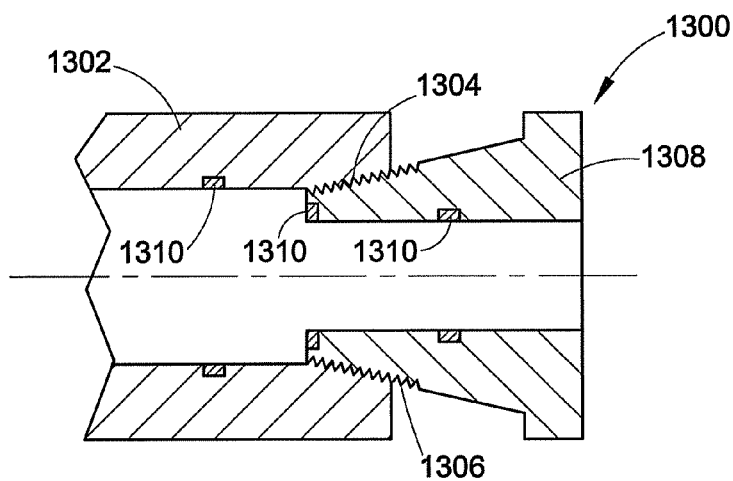
FIG. 10 illustrates threaded taper connection in longitudinal cross-section, and with a sensing function.

In the illustrated example of FIG. 8A, the gasket 1280 further includes a sensor or sensors 1286 in accordance with the inventions herein. The sensors may be wetted or non-wetted as needed, and sensors may optionally be included with either or both of the glands. FIGS. 9A and 9B further illustrate that conventional gaskets or rings 1290 may also be provided with sensors 1292 as set forth herein. The gasket 1290 may be an additional component installed in a fitting, or may be a fitting member that, for example, provides a sealing and/or structural function in the fitting. The gasket 1290 may thus also be considered a sensor carrier as it allows a sensor or sensors to be installed in a fitting. In FIG. 9A the sensor is associated with the gasket along an internal diameter 1294 and in FIG. 9B the sensor is associated with the gasket along an outer facing surface 1296, such as in a recess 1298. For FIGS. 8, 9A and 9B the sensors may be as described herein or others. Finally, FIG. 10 illustrates one form of a conventional threaded taper connection, such as for example an NPT threaded connection 1300 in which a female body 1302 has a tapered threaded portion 1304 that threadably connects with a tapered threaded portion 1306 of a male body 1308. Sensors 1310 as described herein or others, and either wetted, non-wetted or both, may be associated with the female and male bodies as needed.

Figure 11:
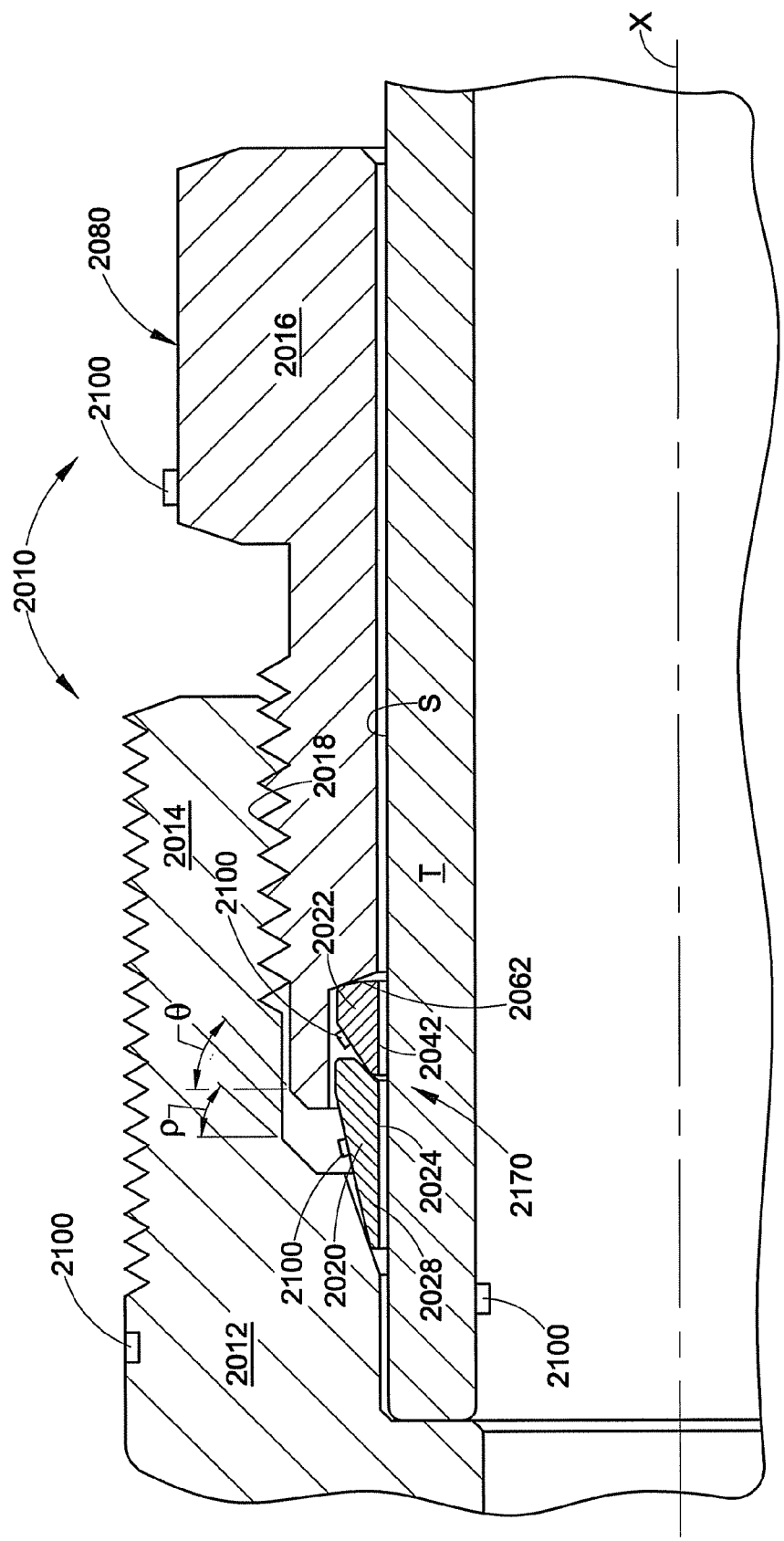
FIG. 11 illustrates a flareless ferrule type fitting illustrated in a finger tight condition

With reference to FIG. 11, the drawing illustrates one example of many different types of a fitting 2010 that may be used with one or more of the present inventions. In particular, FIG. 11 illustrates a flareless compression fitting that uses a smart fitting concept of incorporating one or more sensors into the fitting. Such uses of sensors as illustrated in FIG. 11 may also be used with the zero clearance type fittings described herein. Such a fitting 2010 typically includes a nut 2016 that may be joined with a body 2012 such as, for example, with a threaded connection 2014, 2018. One or more compression type ferrules 2020, 2022 may be used to seal and hold a conduit end such as a tube or pipe end so as to form a leak tight flow path from the conduit to another flow path, in this case through the body 2012. The fitting illustrated in the drawing is commonly referred to as a female fitting in that the body 2012 is a female threaded component that joins with the male threaded nut 2016. Alternatively, as is well known, male fittings are commonly used that have a male threaded body and a female threaded nut. Non-threaded connections may alternatively be used as well. In accordance with the present disclosure, one or more of the fitting components including the body, nut, the ferrules and the conduit end, may be provided with one or more of electrical, electromagnetic or electronic capability, such as for example a sensor or element 2100, that facilitates manufacture, assembly or use of the fitting. The component 2100 may be surface mounted, embedded, etched or otherwise associated with a fitting component as needed for a particular application.

SENSOR INTEGRATION—(a) Sensors are applied to the surfaces of fitting components—e.g. to the fitting body, ferrule or ferrules, nut, tube adaptor, or tube end. Application methods for applying sensors can include sticking, gluing, painting, plating, or in coatings of any type. (b) Sensors are embedded in fitting components. Embedding methods can include resin potting, powder metal sintering, or brazing. (c) Sensors are made concurrently integral to fitting components, as the components are manufactured. Such concurrent methods can include metal injection molding, casting, or compression and injection molding in the case of plastic fitting components. Concurrent methods can also include sensor placing or embedding at regular intervals on or in bar stock, such that one or more sensors remain in each machined component. (d) Sensors may be chipless in the sense that they are printed, etched, sputtered, or likewise marked onto fitting components. Such marking methods can include application of sensor circuitry material to the component, making use of the component material substrate. Marking methods may not necessarily use silicon applications. Marking methods can also include use of electrical conductor altering properties of a diffusion modified near surface of the component, doping elements within the component alloy or material, or dispersed or localized second phases within the component material. (e) Sensors are integrated with fitting design. Such integration can include access ports to aid sensor powering or data query, whether by electro-magnetic effects, acoustic-magnetic effects, magnetic resonance, inductive coupling, IR, eddy current, surface acoustic waves, or ultrasonic.

SENSOR APPLICATIONS—(a) Sensors applied to components provide component history, QA/QC information, source tracing back to the manufacture of the raw material melt or equivalent. (b) With use of a central registry, sensors guard against and detect incidence of component intermix or component counterfeiting. (c) Sensors provide data specific to the fitting—e.g. product ratings, codes and standards, material and fluid compatibilities, and installation instructions. (d) Sensors provide feedback on the condition or success of fitting installation in a fluid system—e.g. ferrule order, tube bottoming, turns of the nut. Such feedback can be coupled with visual, color codes, vibrating, audible or voice devices for immediate access to fitting specific data and indication of installation condition. Such feedback can also include both self diagnostics and suggested remedies. (e) In use, sensors provide indication of changes in the installation—e.g. nut turning, tube slippage, component removal, corrosion effects, any other impending dysfunction, as well as successful ferrule or component response adapting to a changing fluid system. (f) In use, sensors provide measurement of fluid system and fluid state parameters—e.g. pressure, temperature, fluid properties, fluid flow rate, or system vibration. Sensors can relate such measurements to applicable agency codes, standards, product ratings, and can warn if exceeding allowed ratings or levels. Fluid flow methods can include IR signal processing. (g) In use, sensors detect fluid leaks and provide indications of leak rate, as well as confirmation of successful fluid sealing. Leak and seal detection methods can include ultrasonic signal processing.

SENSOR TECHNOLOGY—(a) Sensor are wired or wireless. Sensors can include the fluid system tubing in the sensor circuitry. If wired, this can include use of fluid system tubing for sensor powering or signal transmission. If wireless, this can include use of the system tubing as antenna. In both cases, sensors can use the position of tubing in the fitting as part of circuitry indicating successful tube position during and after installation. (b) Sensors are powered or passive. If powered, sensors can use batteries or miniature fuel cells. They can draw direct external electrical power or draw power through use of electro-magnetic field effects, magnetic resonance, inductive coupling, infrared (IR), eddy current, surface acoustic waves or ultrasonic. Sensors can also draw power from the environment—e.g. changes in temperature, system fluid flow, static charge build-up, system vibration, or galvanic effects of locally dissimilar materials. If passive, sensors are powered by incoming query from an external device. Such queries can use any of the above methods for the continuous powering of powered sensors. (c) Sensors use present or emerging signal processing and communication protocols. If wired, protocols include 4 to 20 m-amps. If wireless, protocols include WiMax, 3G or 2G cellular, Wi-Fi, Bluetooth, Zigbee, Ultra Wide Band, or RFID. Protocols can also include use of mobile phones or equivalent mobile reader devices to collect data and communicate with a central registry. Such mobile reader devices can be integrated into the tools used for fitting pull-up. (d) Sensors are piezoelectric or respond similarly to mechanical deflection or strain. Applied on or in fitting components, sensors respond to fluid system parameters—e.g. pressure, vibration, ultrasonic effects of fluid leaks—as well as extent of fitting pull-up during or after installation.

Figure 12:
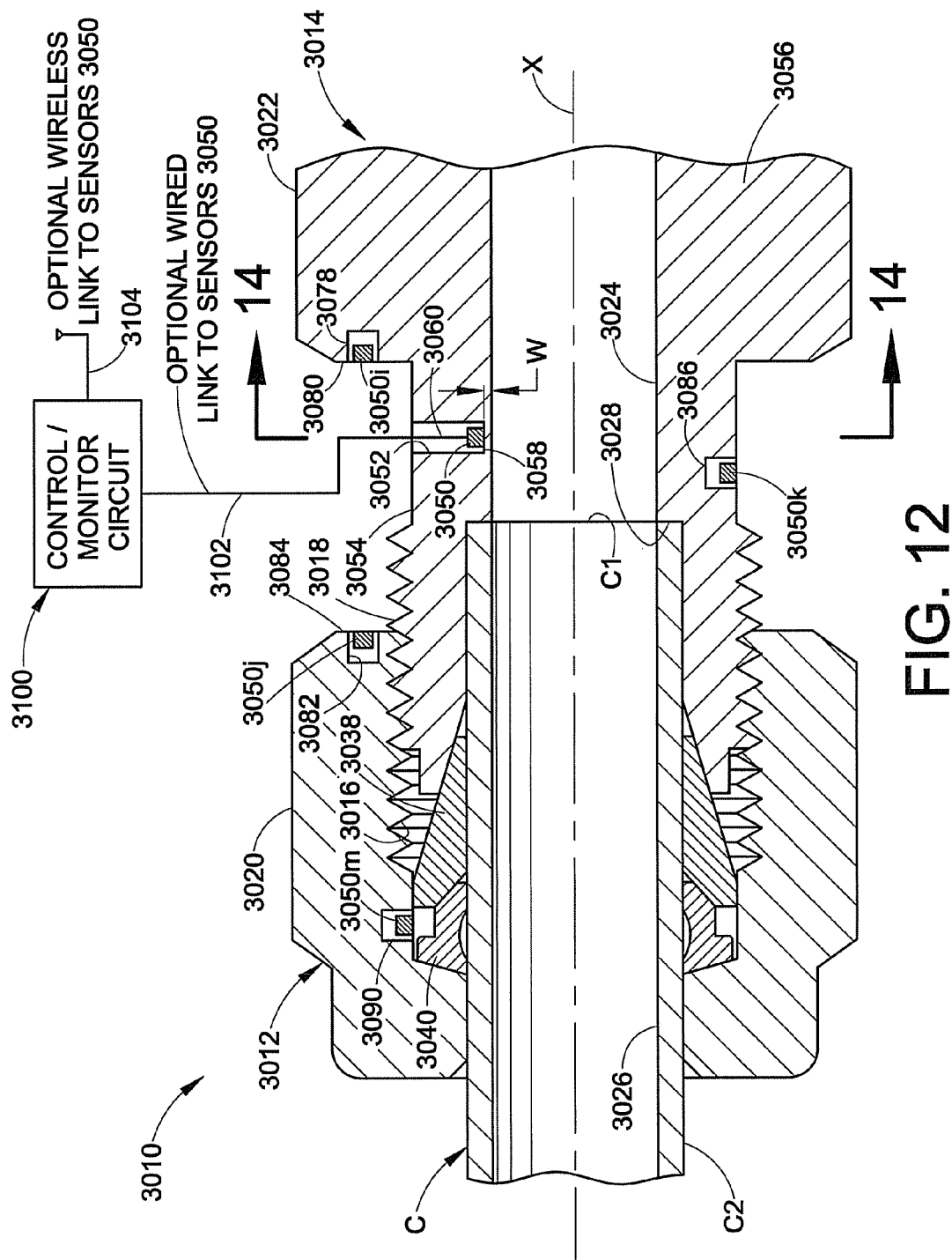
FIG. 12 is an embodiment of a fitting assembly incorporating one or more inventions disclosed herein, illustrated in longitudinal cross-section and in a finger tight condition prior to pull-up.

With reference to FIG. 12, another embodiment of one or more of the inventions is presented. An exemplary assembly 3010 for mechanically attaching or connecting a conduit end C to another fluid member is illustrated. The assembly 3010 is also referred to herein as a mechanically attached connection or fitting, but the term fitting is intended to be broadly construed as any arrangement by which a conduit end may be mechanically attached or connected to another fluid component. For reference purposes only, the conduit C has a central longitudinal axis X. Reference herein to 'axial' movement or displacement and 'radial' movement or displacement is made with respect to the axis X.

The assembly 3010 may include a first coupling member 3012 and a second coupling member 3014. The coupling members 3012, 3014 may be any suitable arrangement by which the assembly 3010 is installed with conduit grip and seal on the conduit end C. For the FIG. 1 embodiment, the first coupling member 3012 may be realized in the form of a female threaded nut, and the second coupling member 3014 may be realized in the form of a male threaded body. As used herein, a coupling member in the form of a 'body' receives the conduit end, typically but not necessarily in a conduit socket. A coupling member in the form of a 'nut' is joined to the body to tighten or pull-up the fitting to a made condition with proper conduit grip and seal, with the nut typically including a drive surface that engages the conduit gripping member during pull-up or may alternatively engage a drive member that engages the gripping member. These components are 'coupling' in the sense that they can be joined together and tightened so as to install the assembly 3010 onto the conduit end C so that the assembly 10 grips the conduit to prevent the conduit from loosening under any one or more environmental stresses such as temperature, pressure, strain and vibration to name a few examples. The assembly 3010 also provides a seal against loss of fluid. The fluid that is carried by the conduit C may be gas, liquid, a combination thereof or any other fluid medium. The assembly 3010 may find typical application in making connections within an overall fluid system. A fitting assembly such as the exemplary fitting 3010 works within the fluid system to help contain the fluid, and in many cases must contain the fluid under various pressure requirements, as well as temperature and other environmental effects. It should also be noted that one or both of the coupling members may in practice be part of or integral with a fluid component, and not necessarily a discrete component as illustrated herein. For example, the body 3014 may be integrated or associated with a valve body, a manifold or any other fluid component to which a conduit is to be attached.

The coupling body 3014 may itself be considered a fluid member that is connected to the conduit end C, or may include an end configuration (not shown) that may be further connected to another part. For example, the end configuration for the body 3014 may include a male threaded end of a conventional tube fitting body, but any end connection configuration may be used as needed to connect the conduit end C into the fluid system or to another fluid member.

Although this embodiment provides for a threaded connection 3016, 3018 between the first and second coupling members 3012, 3014, threaded connections are only one of the many available choices. Alternatives include but are not limited to clamped or bolted connections. The type of connection used will be determined by the nature of the force needed to secure the assembly 3010 to the conduit end in a fluid tight manner. Generally speaking, a fitting such as illustrated in FIG. 12 may be used for a flareless end connection, meaning that the conduit cylindrical shape is not flared as a processing step prior to connection to another fluid member (although the conduit may plastically deform during the installation process). The conduit end does not require any particular preparation other than perhaps the usual face and debur process for the end face C1.

The first coupling member 3012 and second coupling member 3014 may include wrench flats 3020, 3022 respectively to assist in joining and tightening the assembly 3010 together during pull-up of the fitting. Relative rotation between the coupling members 3012, 3014 may be used to tighten and loosen (also known in the art as "make" and "unmake") the fitting assembly 3010 as appropriate.

The second coupling member 3014 may include a central bore 3024 having a diameter that is about the same or the same as the diameter of inside cylindrical wall 3026 of the conduit C. For most connections, although not necessarily required in all cases, the bore 3024 and conduit C are aligned and assembled in a coaxial manner along the axis X.

Figure 13:
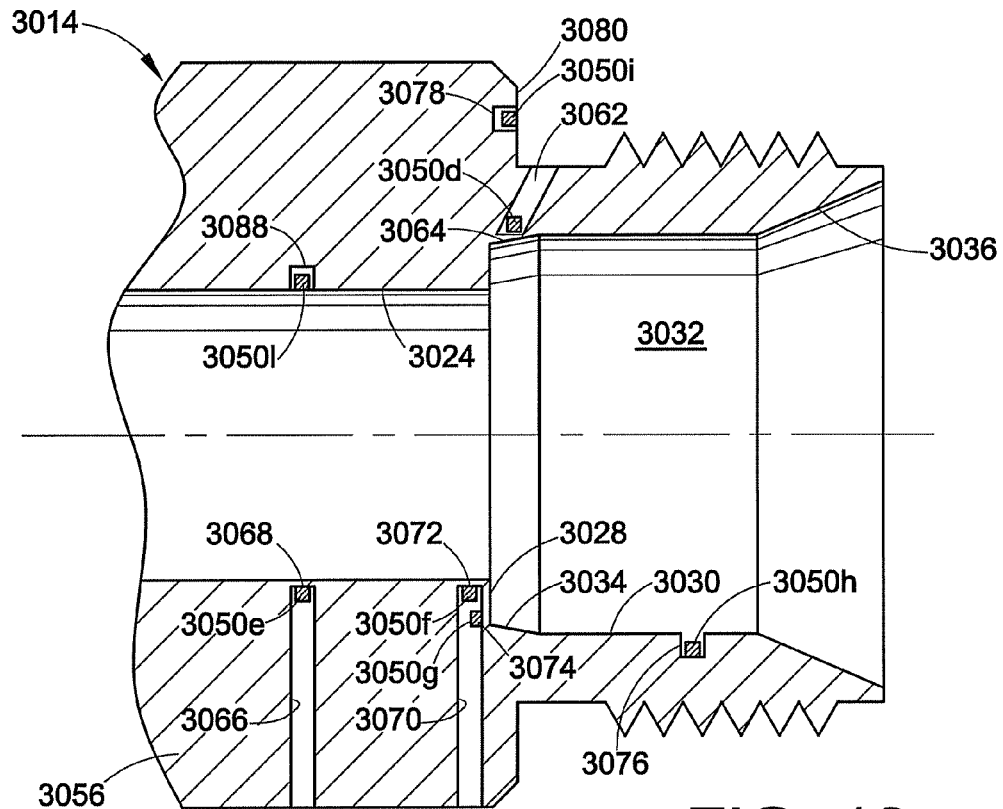
FIG. 13 is an enlarged view of a body type coupling member such as may be used in the assembly of FIG. 12, in longitudinal cross-section.

With reference also to FIG. 13, the body type coupling member 3014 may include a counterbore 3028 that with an interior generally cylindrical wall 3030 defines a tube socket 3032 into which the conduit end C is inserted as part of the assembly process (see FIG. 1). The interior generally cylindrical wall 3030 may have a diameter that closely receives the outer diameter surface C2 of the conduit end C (FIG. 1). The interior wall 3030 is referred to herein as 'generally' cylindrical in that it may include a short length portion 3034 that adjoins the counterbore 3028 that has a slight taper to it. The interior wall 3030 extends axially to a frusto-conical camming surface 3036.

Referring to FIGS. 12 and 13, the fitting assembly 3010 may include one or more conduit gripping members, such as ferrules for example, with two ferrules 3038, 3040 being illustrated in the embodiment of FIG. 12. Some fitting designs only use one ferrule, others may use more than two ferrules, alternatively may use additional parts such as seals, gaskets and so on, and alternatively may use gripping rings or devices that might be generally known by terms other than 'ferrule' but provide grip and seal as a conduit gripping member. As used herein, the terms ferrule and conduit gripping member are intended to include within their definition and meaning any component or combination of components that may grip the conduit end after pull-up, seal the fitting either along the conduit or elsewhere, or both. For example, in a single ferrule fitting the single ferrule both seals and grips the conduit. In the exemplary two ferrule assembly of FIG. 12, the forward or front ferrule 3038 typically may be used to form a fluid tight seal against the camming surface 3036, but may also grip the conduit in some designs and may also in some designs seal against the conduit outer surface C2. The rearward or back ferrule 3040 typically may be used to grip the conduit C, but may also seal against the conduit or seal against the back end of the front ferrule 3038. Fitting designs that use ferrules or other conduit gripping and sealing devices are well known and vary widely in their design and ratings, such as pressure and leakage ratings. The ferrules may be provided to grip the conduit C against an outer surface C2 thereof. For higher pressure applications it may be desirable for the ferrule or ferrules to indent, cut or bite into the conduit outer surface C so as to provide a strong gripping pressure and resistance to the conduit C backing away under pressure and potentially compromising fluid tight seals within the fitting 3010. However, in lower pressure applications the conduit gripping members 3038, 3040 may be designed to adequately grip the conduit without actually indenting or cutting the conduit surface C2. In addition to providing an appropriate gripping force on the conduit C, the gripping members 3038, 3040 may also provide a primary or secondary fluid tight seal against the conduit external surface C2 to protect against loss of fluid from the assembly 10. Therefore, as understood herein, a conduit gripping member or ferrule is any part or combination of parts that, upon complete pull-up of the fitting, grips the conduit against pressure, vibration and other environmental effects, and also provide a fluid tight seal.

From the finger-tight condition illustrated in FIG. 12, as the first and second coupling members 3012, 3014 are tightened together, the ferrules 3038, 3040 are axially driven together and deform as designed to provide upon a completed pull-up the desired conduit grip and seal for the fitting assembly 3010 on the conduit C.

The present inventions are not limited to any particular fitting design or configuration, but rather are directed to the idea of introducing into or including with such fittings a sensing function. Due to the sometimes highly complex and numerous uses of fittings in a fluid system, it may be desirable to be able to sense one or more conditions, or collect data and information, regarding the assembly, performance or health of a fitting or the fluid contained by a fitting or both. With so many fittings already in use, easily numbering in the billions, the present inventions provide apparatus and methods for introducing sensing functions into an existing fitting design, an installed fitting design, or providing a sensing function as part of a new fitting or fitting installation, repair, retrofit or as part of a maintenance operation. With the ability to provide ubiquitous and facile installation of a sensing function with a fitting, the fluid system designer may develop all different types of control and monitoring circuit or systems 3100 to utilize the data and information collected or obtained right at the fitting site, including as needed on a real-time basis. The control and monitoring system or circuit 3100 may be conveniently disposed outside the fitting, even in a remote location, and use wired 3102 or wireless communication 3104 links with the sensor (3050 described herein below) to receive the data and information provided by the sensor. Alternatively, part or all of the circuit 3100 may be integrated with the fitting, for example, to provide a visual indication that the fitting is performing properly. In this sense, a fitting with a sensing function can be considered a 'smart fitting', meaning that a fitting or assembly for a mechanically attached connection includes a sensing function that may provide information or data to an analytical function or process about the health, properties, assembly, condition and status of one or more of the fitting components, the fluid contained by the fitting, or both. In the present disclosure, the exemplary embodiments as illustrated herein include a sensing function that is incorporated into or otherwise associated with a component or part or member of the fitting, or added to a fitting by means of a sensor carrier or substrate that is provided to position a sensing function in the fitting to perform its designed function.

Smart fittings comprise fitting components with integrated sensors. Fittings include mechanically attached couplings that connect conduit ends both with and without additional preparation of the conduit ends. Conduit includes both tube and pipe. Fitting pull-up includes installation or attachment to conduit ends both by hand and with machine assist. Installed fittings include those in installations for containing system fluids both pressurized and partial vacuum.

Smart fitting applications include, as examples:

(1) Installed Fitting Health—Sensors in the fitting components measure conduit and component loads and relative positions as measures of both initially sufficient and sustained-in-use installed fitting pull-up. Sensor types include micro-strain, proximity, vibration/acceleration, ultrasonic and cycle count.

(2) Installed Fitting Seal Integrity—Sensors in the components of installed fittings measure incidents of seal leakage of system fluids. Sensor types include ultrasonic and chemical detectors.

(3) System Fluid Measurement—Sensors in the components of installed fittings measure the characteristics of system fluids. Sensor types include temperature, pressure, flow, density, refractive index, viscosity, optical absorbance, dielectric characteristic, conductivity, pH, turbidity, thermal conductivity, moisture and chemical specie.

(4) Integrated Sensors—Sensors attach to fitting components by methods including direct printing or fabrication on the component surface, on gaskets or inserts that assemble into and between fitting components.

(5) Sensor Communication—Sensors are wireless and passive, both wetted and non-wetted by system fluids. Wetted sensors communicate through the system fluid containing walls of the fitting components without antenna or wires that breach the fluid containing walls. Wetted sensors also have known chemical compatibility, duty cycle and failure mode.

(6) Traceability—Sensors (e.g. RFID) in the fitting components provide fitting and component characteristics including identity, serialization and code compliance.

In the exemplary embodiment of FIG. 12, a sensing function or functions may be executed by one or more sensors 3050 associated with the fitting 3010. A small sensor bore 3052 may be provided in the body 3014, for example, such as through a neck portion 3054 that tends to be somewhat smaller in diameter and wall thickness than the body end 3056. The sensor 3050 in this example is a non-wetted sensor, so that the bore 3052 does not penetrate through the neck 3054 but rather may extend into the neck such that a thin wall section 3058 of thickness W separates the bore 3052 from the flow path through the body central bore 3024. The shape and size of the sensor bore 3052 may be selected so as to not weaken the neck 3054 adversely to the overall performance requirements of the particular fitting design. The sensor 3050 may be disposed anywhere within the sensor bore 3052, and in particular may be positioned down in the bore against the wall 3058. A wire 3060 may be routed through the bore 3052 from the sensor 3050 to the wired connection 3102 for the control circuit 3100, or alternatively the wire 3060 may function as an antenna for a wireless link 3104 to the circuit 3100 or a different wireless communication link may be used as needed. As on example, the sensor 3050 may be a temperature sensor or may also be an acoustic sensor for fluid flow through the central bore 3024. Many different sensor designs and functions may be used as needed.

Figure 14:
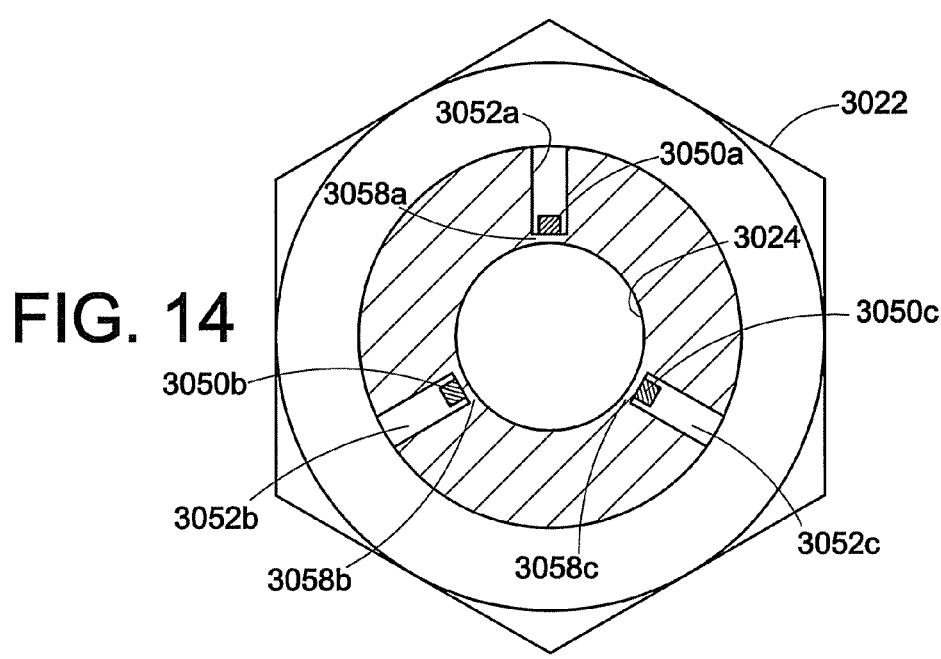
FIG. 14 is a view in cross-section taken along the line 14-14 in FIG. 12.

With reference to FIG. 14, because the bore 3052 may be fairly small, more than one sensor and sensor bore 3050a, b and c and 3052a, b and c may be provided around the neck 3054 for additional sensing functions. Although the numeral 3050 is used as a general reference to the sensors herein, this is not intended to imply that the same sensor or sensing function is used for all the sensors, but rather just to illustrate different positions and functionality facilitated by the inventions herein. Thus, multiple sensors may be used with the same sensing function or many different sensors and sensing functions may be used as needed. In FIG. 14 we illustrate three sensors, but more or less than three may be used. Also in FIG. 14 the sensors 3050a, b and c are illustrated as evenly spaced about the circumference of the neck 3054 but such is not required. Each bore 3052a, b and c may terminate at a thin wall 3058 a, b and c respectively.

The location of the bore 3052 is a matter of design choice based on the sensing function or functions desired for a particular fitting or fitting application. With reference to FIG. 13, a bore 3062 may be provided that terminates at a thin wall 3064 at the tapered portion 3034 of the tube socket 3032. A sensor 3050d may be used for example to detect proper conduit bottoming and/or deformation/strain of the conduit end C1 after a completed pull-up operation of the fitting 3010. A sensor 3050d may also be used that detects system fluid pressure. Other sensing functions may be used as needed.

FIG. 13 further illustrates optionally providing a bore 3066 through the end 3056 of the body 3014 to position a sensor 3050e. The bore 3066 terminates at a thin wall portion 3068. Again, the bore 3066 may be sufficiently small to avoid weakening the body 3014, and additional bores may be provided as needed. FIG. 13 further illustrates optionally providing a bore 3070 that facilitates positioning two sensors 3050f and 3050g respectively at thin wall sections 3072 and 3074. These sensors may be used for example to detect conduit bottoming, extent of proper pull-up, system pressure, temperature and so on. The bore 3070 may be formed anywhere in the body 3014 wherein it is desired to position sensors. A sensor (not shown) may also be disposed in a recess in the conduit end C1 that faces the counterbore 3028. Such a sensor may also be used to detect proper bottoming, pull-up or many other sensing functions as needed.

In all the exemplary embodiments herein, the sensors 3050 may be wired, wireless or a combination there of, and my be wetted or non-wetted as the case may be. Other interrogation techniques may include, for example, use of a wand that when passed in the vicinity of the sensor would detect its output or condition.

As other examples, in FIG. 13 we illustrated an optional wetted sensor 3050h that may be disposed in a recess 3076 formed in the body inner cylindrical portion 3030. Another optional sensor 3050i (see FIGS. 12 and 13) may be positioned in a recess 3078 formed in a shoulder 3080 of the neck 3054. This sensor 3050i may be, for example, a proximity sensor used to detect that the nut 3012 advances sufficiently during pull-up to indicate that a proper pull-up has occurred, and which in some designs may further may indicate that the various fitting components were properly installed. Alternatively or in addition to the sensor 3050i, a sensor 3050j may be disposed in a recess 3082 formed in a facing surface 3084 of the nut 3012. This sensor may be, for example, a proximity sensor to verify pull-up.

As another example, a sensor 3050k (FIG. 12) may be disposed in a recess 3086 formed in the neck 3054. Such a sensor may be a proximity sensor for example to detect proper position of the nut 3012 after pull-up. Still further, a wetted sensor 3050l may be provided in a recess 3088 formed in the central bore 3024 (see FIG. 13) of the body 3014. As another example, a wetted sensor 3050m may be provided in a recess 3090 formed in the nut 3012. This sensor 3050m may be used, for example, to detect system fluid leaks or position of one or both ferrules 3038, 3040.

In addition to the use of temperature sensors and so on, in the example of the sensor 3050k, one or more such sensors may be a strain gauge, such as for example a MEMS strain gauge available from American Sensor Technology, N.J. The strain gauge may be used to detect strain changes in the body 3014 or nut 3012 during pull-up so as to provide an indication to the operator that a proper pull-up has occurred. For example, a ring or other plurality of such strain gauges 3050k may be integrated with the body neck 3054 to report on strain changes during pull-up. In such an alternative embodiment it will be desirable that the conduit end C1 extend axially deeper than is illustrated in FIG. 12, for example so as to extend up to or past the sensors 3050k (not shown). Another option would be to use a ring of such sensors to measure or detect hoop stress, which would correlate to system pressure, for example, or proper pull-up forces as another example. Such strain gauges typically function as changes in resistance in response to strain, and such resistance changes may be detected by the circuit 3100. Changes in stress as detected by the sensor or sensors may then be correlated to force loads required to create the micro-stresses. In this manner the circuit 3100 may be used to determine that sufficient pull-up force has been applied or detect over or under torque conditions. After a fitting has been placed into service, the strain gauges may be use to detect changes in stress related to high pressure, temperature, vibration and so on as part of a fitting health verification. As in all the examples herein, the sensor 3050k may be active (generating its own power and output) or passive (being interrogated and powered externally), wired or wireless. For this example, the strain gauges 3050k may be integrated with the body 3014 or nut 3012 in ways other than the use of recesses. The strain gauges may be disposed on the surface of the neck 3054, for example, or printed thereon, molded therein and so on to name just a few examples.

The sensors 3050 need not be directly attached or installed on the fitting 3010 coupling members. For example, a wetted sensor 3050 may be disposed on or integrated with a sensor carrier or substrate. A sensor carrier may be realized in the form of an annular ring-like member such as a gasket, for example.

A wetted sensor may be used to detect or sense properties of the fluid, such as for example, flow rate, turbulence (such as with an acoustic sensor), temperature, pressure and so on as will be further elaborated on below. Alternatively, a sensor may be wetted although its function or one of its functions is directed to sensing a condition of a fitting component rather than of the fluid. For example, a sensor 3050 may be a proximity sensor or strain gauge or other sensor used to detect bottoming of the conduit end C1 in the tube socket 3032, or to detect changes in condition of the fitting such as vibration, loosening and so on. In another alternative, a sensor may be positioned on the conduit end C2 prior to installing the conduit end into the fitting 3010, or on the counterbore 3028 surface. Sensors 3050, for example an acoustic sensor, may further be used to detect vibration in the conduit C or acoustic signatures of fluid flow through the fitting 3010 or that of leakage from fitting 3010 or nearby seals.

The sensors 3050 may be attached to, integrated with or otherwise associated with the fitting coupling members. The sensors 3050 may take a wide variety of forms and functions. Each sensor 3050 may be a wetted sensor meaning that a portion of the sensor is exposed to the system fluid passing through and contained by the fitting 3010, or a non-wetted sensor that is not exposed to the system fluid, or a combination thereof. A sensor 3050 may be used, for example, to sense, detect, measure, monitor or otherwise collect information or data about a property or characteristic of one or more fitting components or the fluid. A wetted sensor may sense, for example, pressure, temperature, galvanic effects, fluid density, refractive index, viscosity, optical absorbance, dielectric properties, flow rate, conductivity, pH, turbidity, thermal conductivity, moisture, gas or liquid specific properties and so on to name a few examples. Examples for a non-wetted sensor may include, pressure, temperature, seal integrity, leakage, leak rate, stress and stress profiles, vibration, tube bottoming and so on.

The sensors 3050 may individually operate in many different ways, including but not limited to electromagnetic, optical, acoustic-magnetic, magnetic resonance, inductive coupling including antenna, infrared, eddy current, ultrasonic and piezoelectric. The sensors 3050 may communicate in a wired or wireless manner with the latter including but not limited to BLUETOOTH™, Wi-Fi, 2G, 3G, RFID, acoustic, infrared, and optical. Due to the location of the carrier 3052 in FIG. 12, in this embodiment most likely the sensor 3050 would communicate in a wireless manner. However, alternatively appropriate grooves and notches may be provided so that a wired sensor may be used, with the wires being routed outside the fitting 3010 through the recesses, including recesses in the threads 3016, 3018. Still as another alternative, wires may be routed to another location in the fitting 3010 for wireless communication, or a wireless link may be used between the sensor 3050 and another device associated with the fitting that in turn is wired to the circuit 3100.

The circuit 3100 may be any conventional circuit or custom circuit as the case may be to process the signals from the one or more sensors 3050, and thus will be determined by the type of sensor and the type of output signal the sensor provides. Such circuits are well known and well associated with sensors that are presently available commercially, as set forth herein below.

The sensors 3050 may be of a design and function as described herein above, or other sensors may be used as required for a particular application.

Figure 15:
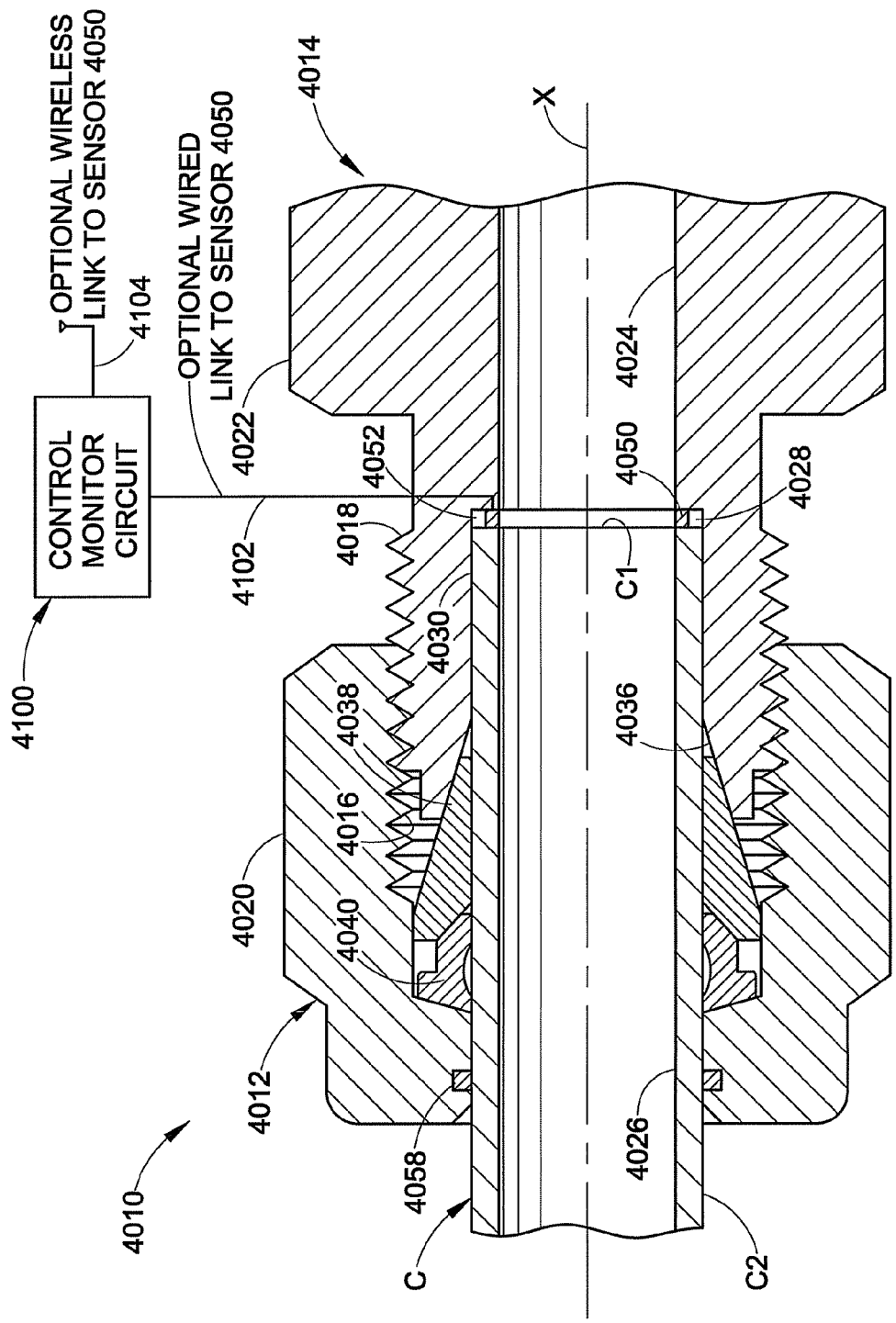
FIG. 15 is an embodiment of a fitting assembly incorporating one or more inventions disclosed herein, illustrated in longitudinal cross-section and in a finger tight condition prior to pull-up.
Figure 16:
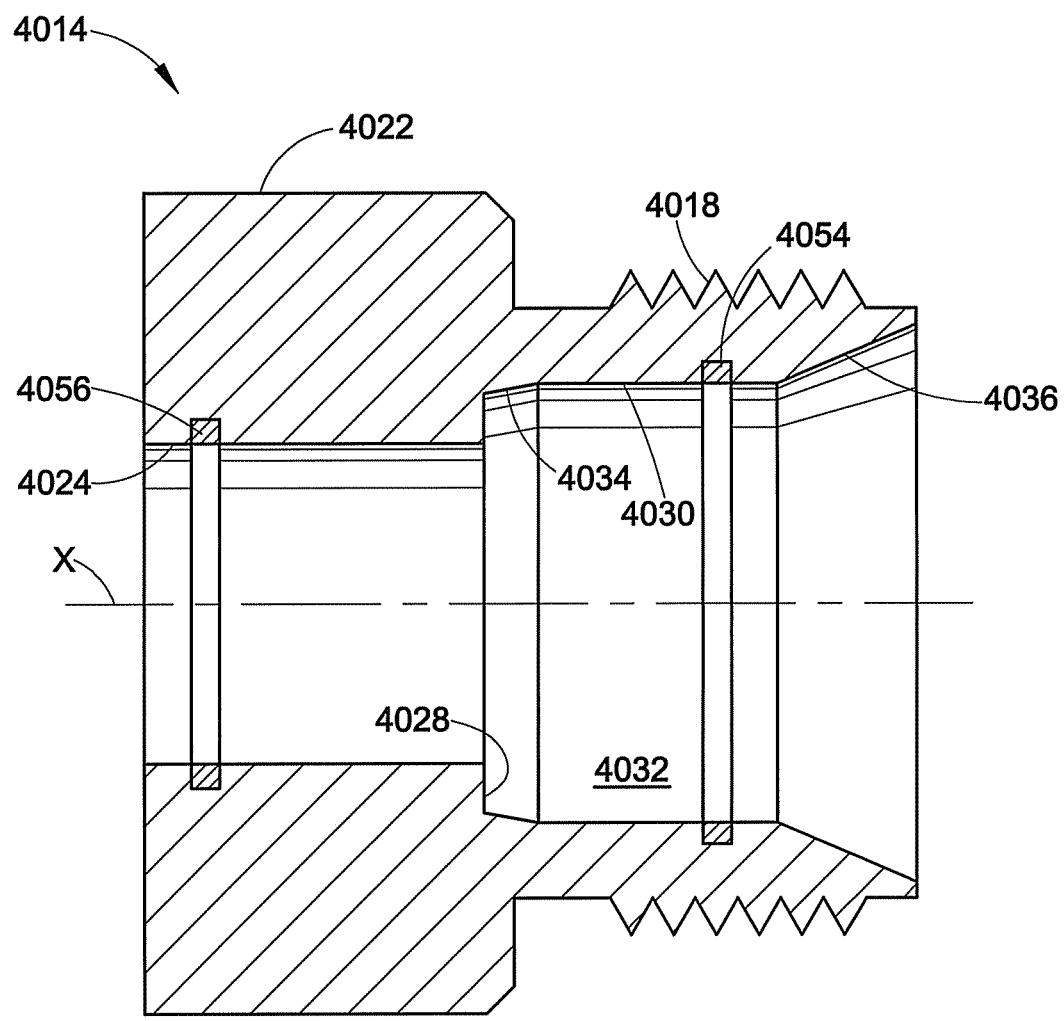
FIG. 16 is an enlarged view of a body type coupling member such as may be used in the assembly of FIG. 15, in longitudinal cross-section.

With reference to FIGS. 15 and 16, besides introducing sensing functions into the fitting components such as a body, nut or conduit gripping devices, the sensors or sensing functions need not be directly attached, installed or integrated with the fitting components. One or more sensing functions may be introduced into a fitting by the use of an additional or modified component for the fitting or both. For example, a wetted sensor 4050 may be disposed on or integrated with a sensor carrier or substrate 4052. In this embodiment the sensor carrier 4052 may be realized in the form of an annular ring-like member such as a gasket, for example. The specific configuration, shape, material, location, orientation and position of the carrier 4052 relative to the fitting, as well as the sensor 4050 on the carrier 4052, will be determined based on the function or functions to be carried out by the sensor 4050, as well as the selected communication link between the sensor 4050 and an interrogating or information collecting circuit 4100. As an example, the sensor 4050 in FIG. 15 will be a wetted sensor, meaning that at least a portion of the sensor 4050 is exposed to the fluid contained by the fitting 4010, for example, the fluid flowing through the bore 4024. The carrier 4052 may be positioned in the tube socket 4032 area, such as up against the counterbore 4028. The conduit end C1 then may bottom against the carrier 4052, and either be in contact with the sensor 4050 or not in contact with the sensor 4050 as the case may need to be. Note that in the embodiment of FIG. 6 for example, the gasket 48' also serves as a substrate or carrier for the sensors 120a, 120b.

The location of the sensor 4050 may be selected as needed. For example, in FIG. 16 we illustrate that a groove or recess 4054 may be formed in the interior cylindrical wall 4030, into which a sensor carrier such as a split ring may be snapped in, or a recess or groove 4056 may be provided in the central bore 4024. Alternatively, a groove 4058 may be provided as needed in the first coupling member 4012 (FIG. 15) to receive a sensor carrier. Such a sensor position may be used, for example, to detect vibration in the conduit C, or alternatively for leakage of fluid past the ferrules, to name just two examples. In some cases it may further be possible to include the sensor 4050 or sensor carrier with one of the ferrules, particularly the front ferrule that may not exhibit as much plastic deformation during pull-up as the back ferrule. However, a sensor mounted on the back ferrule may be used to confirm that a desired deformation did occur during a proper pull-up.

The use of a sensor carrier or substrate 4052 to position a sensor 4050 within the fitting 4010 allows for easy installation and adaptation of a fitting with a sensing function, even for fittings that are already installed or of established design. This allows the designer to incorporate a sensing function when needed or to omit the sensing function by either not connecting to the sensor or simply not installing the sensor and sensor carrier. This allows a sensing function then to be added into a fluid system even after a non-sensing fitting has been installed, simply by installing the carrier 4052 having a desired sensing function associated therewith.

The one or more sensors 4050 may be incorporated into or associated with the carrier 4052 by any number of suitable techniques, including but not limited to adhesive, painting, embedding, sputtering, metal injection molding, casting, compression, etched, printed and so on.

The sensors 4050 may be integrated onto the wetted surfaces of the generally circular ring or hoop-like carrier 4052. The sensors 4050 may be integrated onto the inside diameter surfaces or on radial surfaces that when assembled in the fitting 4010 will be wetted by system fluids. The sensor elements may be laminated, printed, attached, adhesively applied or equivalently applied or otherwise applied directly to the selected surfaces. The sensor carrier may comprise a split-ring assembly or seal insert to enable direct printing or applying of sensor elements to the sensor carrier inside diameter surfaces. Where axial orientation of the sensor is important, for example sensors for fluid flow, the sensor carrier may be keyed to axially differentiated slots or grooves. The sensor carrier may be keyed directionally using counterbores, circumferential shoulders, or the like to match directionally keyed structures on the fittings, particularly face seal fittings. The sensors 4050 that are integrated into the fitting 4010 may be hard wired connected to the electronics 4100 or other sensors or both, and thus may comprise leads or equivalent to external surfaces to hard wire the sensor from outside the containment of system fluids. Such leads may form a composite with the carrier such there is no compromise of system fluid containment or seal integrity. Sensors integrated into the carrier may comprise leads or equivalent to provide external antenna for the sensors. Here also, such leads form a composite with the carrier such there is no compromise of system fluid containment or integrity. Sensors integrated into carriers, whether fully passive or powered by built-in battery or fuel cell, may alternatively comprise no leads to external surfaces, and thus no compromise of system fluid containment or seal integrity.

The electronics 4100 (FIG. 15) may be operably coupled to the sensors 4050 in many different ways, including wired and wireless connections. Wireless connections may include electromagnetic coupling such as by antenna, or optical coupling, acoustic and so on. The specific circuits used in the electronics 4100 will be selected and designed based on the types of sensors 4050 being used. For example, a strain gauge may be used for a non-wetted sensor, and the strain gauge will exhibit a change in impedance, conductivity or other detectable characteristic or condition. The electronics 4100 may provide a current or voltage or other energy to the strain gauge, across a wired connection or wireless connection for example, so as to detect the strain gauge condition of interest. Similarly, the electronics 4100 may interrogate or detect a temperature or pressure sensor condition, or the electronics 4100 may receive signals transmitted from the sensor that encode or contain the information or data of interest produced by the sensor. These are just a few examples of the wide and extensive variety of sensors and electronics that may be used to carry out the inventions herein.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A fitting for a fluid conduit having a longitudinal axis to make a mechanically attached flareless end connection therewith, comprising:

a first coupling member and a second coupling member that are joined together along an axis when the fitting is pulled-up, a front ferrule and a back ferrule that are axially driven together by said first coupling member and said second coupling member to provide conduit grip and seal after the fitting is pulled-up, said first coupling member comprising a threaded nut and said second coupling member comprising a threaded body, and a sensor that is attached to said threaded nut said sensor comprising a proximity sensor that is attached to a surface of said threaded nut, said surface of said threaded nut being a facing surface that faces a shoulder of said threaded body.

2. The fitting of claim 1 wherein said proximity sensor is positioned on said threaded nut to detect leakage of fluid that is to be contained in the conduit by the fitting.

3. The fitting of claim 1 wherein said proximity sensor is disposed in a recess provided in a surface of said threaded nut.

4. The fitting of claim 1 wherein said proximity sensor is disposed on a sensor carrier.

5. The fitting of claim 1 wherein said proximity sensor is disposed on a sensor carrier that is positioned in a recess provided in a surface of said threaded nut.

6. The fitting of claim 1 wherein said proximity sensor comprises a non-wetted sensor that communicates information wirelessly.

7. The fitting of claim 1 wherein said proximity sensor is selected from the following: RFID (Radio Frequency Identification) tag, piezoelectric sensor, ultrasonic sensor, pressure sensor, temperature sensor, optical sensor, capacitive sensor, inductive sensor, resistive sensor, acoustic sensor.

8. A fitting for a fluid conduit having a longitudinal axis to make a mechanically attached flareless end connection therewith, comprising:

a first coupling member and a second coupling member that are joined together along an axis when the fitting is pulled-up, a front ferrule and a back ferrule that are axially driven together by said first coupling member and said second coupling member to provide conduit grip and seal after the fitting is pulled-up, said first coupling member comprising a threaded nut and said second coupling member comprising a threaded body, and a sensor that is attached to said threaded nut, wherein said sensor is disposed on a sensor carrier.

9. The fitting of claim 8 wherein said sensor comprises a wetted sensor or non-wetted sensor that communicates information wirelessly.

10. The fitting of claim 8 wherein said sensor is selected from the following: RFID (Radio Frequency Identification) tag, strain sensor, piezoelectric sensor, ultrasonic sensor, pressure sensor, proximity sensor, temperature sensor, optical sensor, capacitive sensor, inductive sensor, resistive sensor, acoustic sensor.

11. A fitting for a fluid conduit having a longitudinal axis to make a mechanically attached flareless end connection therewith, comprising:

a first coupling member and a second coupling member that are joined together along an axis when the fitting is pulled-up, a front ferrule and a back ferrule that are axially driven together by said first coupling member and said second coupling member to provide conduit grip and seal after the fitting is pulled-up, said first coupling member comprising a threaded nut and said second coupling member comprising a threaded body, and a sensor that is attached to said threaded nut, wherein said sensor is disposed on a sensor carrier that is positioned in a recess provided in a surface of said threaded nut.

12. The fitting of claim 11 wherein said sensor comprises a wetted sensor or non-wetted sensor that communicates information wirelessly.

13. The fitting of claim 11 wherein said sensor is selected from the following: RFID (Radio Frequency Identification) tag, strain sensor, piezoelectric sensor, ultrasonic sensor, pressure sensor, proximity sensor, temperature sensor, optical sensor, capacitive sensor, inductive sensor, resistive sensor, acoustic sensor.

\* \* \* \* \*